US 7,486,606 B2

(12) United States Patent
Sano et al.

(10) Patent No.: US 7,486,606 B2
(45) Date of Patent: Feb. 3, 2009

(54) OPTICAL HEAD AND OPTICAL INFORMATION APPARATUS FOR RECORDING OR REPRODUCING INFORMATION ON AN INFORMATION RECORDING MEDIUM

(75) Inventors: Kousei Sano, Osaka (JP); Yoshiaki Komma, Hirakata (JP); Sadao Mizuno, Ibaraki (JP)

(73) Assignee: Panasonic Corporation, Osaka (JP)

( * ) Notice: Subject to any disclaimer, the term of this patent is extended or adjusted under 35 U.S.C. 154(b) by 625 days.

(21) Appl. No.: 11/151,272

(22) Filed: Jun. 14, 2005

(65) Prior Publication Data
US 2005/0276202 A1 Dec. 15, 2005

(30) Foreign Application Priority Data
Jun. 14, 2004 (JP) ............................. 2004-175130

(51) Int. Cl.
*G11B 7/00* (2006.01)
(52) U.S. Cl. ............................ 369/112.06; 369/112.1; 369/120
(58) Field of Classification Search .................. None
See application file for complete search history.

(56) References Cited

U.S. PATENT DOCUMENTS 6,185,167 B1  2/2001  Arai et al.

(Continued)

FOREIGN PATENT DOCUMENTS

EP  1 391 884  2/2004

(Continued)

OTHER PUBLICATIONS

Kazuhiko Nemoto et al., "Integrated Optical Devices for Optical Disk Applications", IEICE Transactions on Electronics, Electronics Society, Tokyo, JP, vol. E85-C, No. 4, Apr. 2002, pp. 1001-1008.

(Continued)

*Primary Examiner*—William J. Klimowicz
*Assistant Examiner*—Joseph Haley
(74) *Attorney, Agent, or Firm*—Wenderoth, Lind & Ponack, L.L.P.

(57) ABSTRACT

An optical head which is capable of realizing a stable tracking control, even if the rotational center of an information recording medium is not located on the extension line of the transfer directions of a light-concentrating element, includes: a semiconductor laser which emits a beam of light; an objective lens which concentrates the beam of light on an optical disk; a transfer mechanism which transfers the objective lens between the outermost circumference and the innermost circumference of the recording area of the optical disk along the optical disk; and a photo-detector which detects a beam of light that returns from the optical disk. The photo-detector includes a plurality of areas which are divided by a division line. The division line is set parallel to the tangential directions of the track in a predetermined position on the transfer line of the objective lens between the outermost circumference and the innermost circumference of the recording area, and the plurality of areas are divided, by a lateral division line which intersects the division line, into a first area on which a beam of light that mainly includes a tracking component is incident and a second area on which a beam of light that does not include the tracking component is incident.

20 Claims, 15 Drawing Sheets

U.S. PATENT DOCUMENTS

| | | | |
|---|---|---|---|
| 7,245,565 B2* | 7/2007 | Yamasaki et al. | 369/44.32 |
| 2002/0089905 A1* | 7/2002 | Miyazaki et al. | 369/44.23 |

FOREIGN PATENT DOCUMENTS

| | | |
|---|---|---|
| JP | 8-306057 | 11/1996 |
| JP | 10-302304 | 11/1998 |
| JP | 2000-222749 | 8/2000 |
| JP | 2001-101692 | 4/2001 |
| JP | 2003-016672 | 1/2003 |
| JP | 2004-158118 | 6/2004 |

OTHER PUBLICATIONS

S. Ijima et al., "A novel highly Integrated red LDH (laser/detector/hologram) unit for high-density magneto-optical disk system", Technical Digest, Summaries of Papers Presented at the Conference on Lasers and Electro-Optics, Postconference Edition CLEO '99, Conference on Lasers and Electro-Optics (IEEE Cat. No. 99CH37013) Opt. Soc. May 23-28, 1999 Baltimore, Maryland, USA, 1999, p. 492.

* cited by examiner

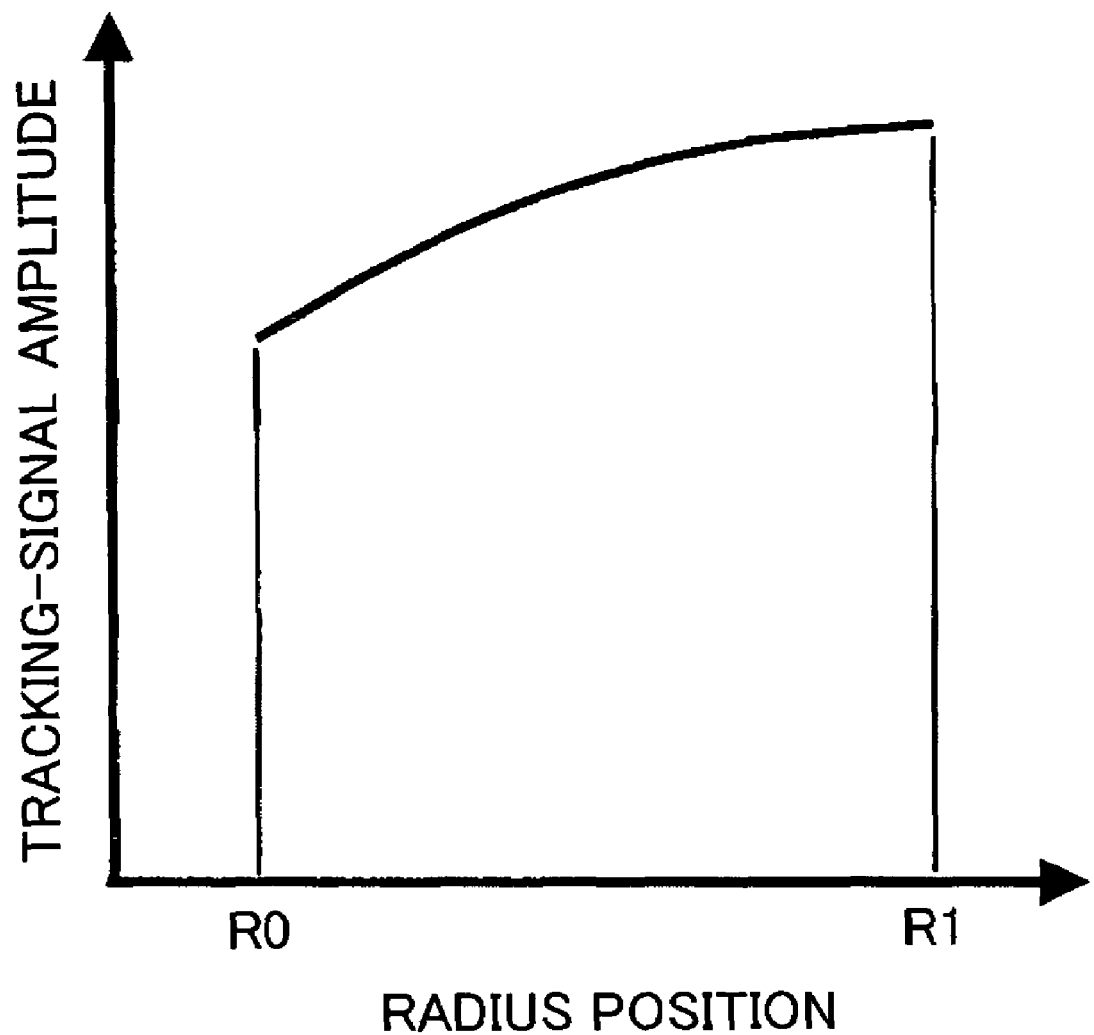

OPTICAL HEAD AND OPTICAL INFORMATION APPARATUS FOR RECORDING OR REPRODUCING INFORMATION ON AN INFORMATION RECORDING MEDIUM

BACKGROUND OF THE INVENTION

1. Field of the Invention

The present invention relates to an optical head, an optical information apparatus and an optical-information reproducing method which records or reproduces information in or from an information recording medium such as an optical disk and an optical card.

2. Description of the Related Art

Conventionally, an optical head is known in which two objective lenses are provided (e.g., refer to Japanese Unexamined Patent Publication No. 2001-101692 specification). One objective lens is disposed on a radius line of an optical disk, and the other objective lens is shifted from the radius line. FIG. 14 shows a conventional optical head which is described in this Japanese Unexamined Patent Publication No. 2001-101692 specification.

In FIG. 14, an optical head apparatus 101 includes a first objective lens 102 and a second objective lens 103. These objective lenses 102, 103 are each used to reproduce an optical disk 106 of a different type. The first objective lens 102 is transferred, by a transferring means, on a straight line 104 shown by a broken line. The second objective lens 103 is transferred on a straight line 105 shown by a broken line. The rotational center of a motor 107 which rotates the optical disk 106 is located on the extension line of the straight line 105. The second objective lens 103 is disposed on a radius line of the optical disk 106. On the other hand, the rotational center of the motor 107 is not on the extension line of the straight line 104, and the first objective lens 102 lies off the radius line. FIG. 15 shows a photo-detector 110 which receives a beam of light that is reflected and diffracted after it has been concentrated on the optical disk 106 by the second objective lens 103. A light-receiving surface 111 of the photo-detector 110 is divided into four by division lines 112, 113. They are disposed perpendicular or parallel to a track-tangent directions 114 of the optical disk 106.

In Japanese Unexamined Patent Publication No. 2001-101692 specification, the method of generating a tracking signal is not specifically described. No concrete description is given about how to stabilize tracking control. Besides, according to the configuration of the division lines 112, 113, a tracking signal can only be obtained by a push-pull method or a phase-difference method. This presents a disadvantage in that a tracking signal has an offset when a lens is shifted, so that stable tracking control cannot be actually obtained.

SUMMARY OF THE INVENTION

In order to resolve the above described conventional disadvantage, it is an object of the present invention to provide an optical head, an optical information apparatus and an optical-information reproducing method which are capable of realizing stable tracking control, even though the rotational center of an information recording medium is not located on the extension line of the transfer directions of a light-concentrating means.

In order to attain the above described object, an optical head according to the present invention, comprises: a light source which emits a beam of light; a light-concentrating element which concentrates the beam of light on an information recording medium that includes a track in a recording area; a transfer mechanism which transfers the light-concentrating element at least between the outermost circumference and the innermost circumference of the recording area along the information recording medium; a splitting element which splits a beam of light that returns from the information recording medium into a plurality of beams of light; and a detector which detects the beam of light that is obtained by the splitting of the splitting element, wherein: the splitting element includes a plurality of areas which are divided by a division line; and the division line is set parallel to the tangential directions of the track in a predetermined position on a transfer line of the light-concentrating element between the outermost circumference and the innermost circumference of the recording area.

According to this configuration, a beam of light which returns from the information recording medium is split by the division line which extends parallel to the track in a predetermined position in the recording area on the transfer line of the light-concentrating element. Therefore, when the optical head is transferred between the outermost circumference and the innermost circumference of the recording area, the detector can separately receive a plurality of beams of light which is obtained by a split. At this time, a change in the amplitude of a tracking signal becomes less than that according to the prior art. This helps make tracking more stable. Besides, the light-passage area of the splitting element is divided, and thereby, a beam of light can be split more precisely and easily in a plurality of areas. In addition, the configuration of the detector can be kept from being complicated.

An optical head according to the present invention comprises: a light source which emits a beam of light; a light-concentrating element which concentrates a beam of light from the light source on an information recording medium that includes a track; a transfer mechanism which transfers the light-concentrating element at least between the outermost circumference and the innermost circumference of a recording area along the information recording medium; and a detector which detects a beam of light that returns from the information recording medium, wherein: the detector includes a plurality of areas which are divided by a division line; the division line is set parallel to the tangential directions of the track in a predetermined position on a transfer line of the light-concentrating element between the outermost circumference and the innermost circumference of the recording area; and the plurality of areas are divided, by a lateral division line which intersects the division line, into a first area on which a beam of light that mainly includes a tracking component is incident and a second area on which a beam of light that does not include the tracking component is incident.

Even according to this configuration, when the optical head is transferred between the outermost circumference and the innermost circumference of the recording area, the detector can separately receive a beam of light in each area. This reduces a change in the amplitude of a tracking signal, compared with the prior art, thus making tracking more stable.

As described so far, the optical head, the optical information apparatus, the optical-information reproducing method and the optical-information recording method according to the present invention, tracking control can be stably executed. This helps record or reproduce information certainly.

These and other objects, features and advantages of the present invention will become more apparent upon reading of the following detailed description along with the accompanied drawings.

BRIEF DESCRIPTION OF THE DRAWINGS

FIG. 5 is a graphical representation, characteristically showing the correlation between the position of a concentrated-light spot and the amplitude of a tracking signal in a conventional optical head apparatus.

DETAILED DESCRIPTION OF THE INVENTION

Hereinafter, the most desirable embodiments for implementing the present invention will be described in detail with reference to the drawings.

First Embodiment

Figure 1A:
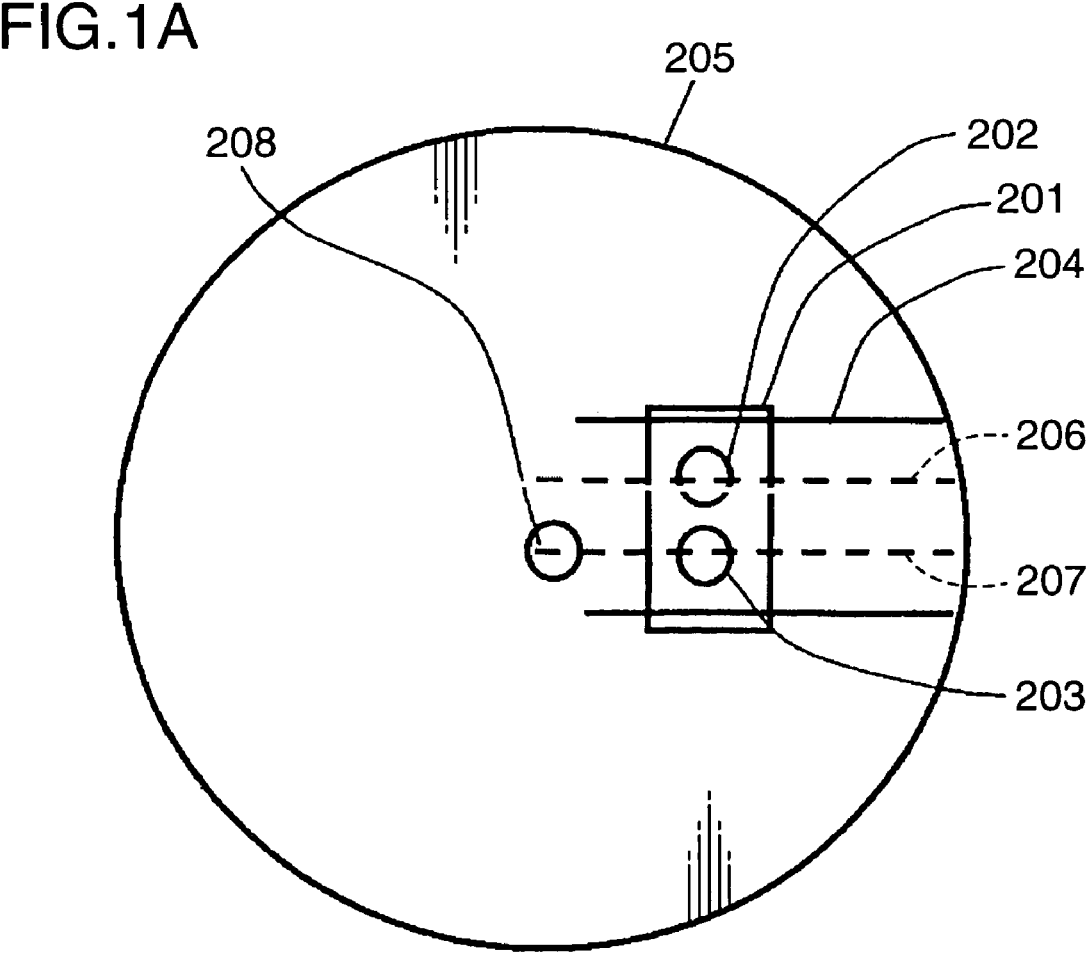
FIG. 1A is a schematic top view of the main part of an optical information apparatus according to a first embodiment of the present invention.
Figure 1B:
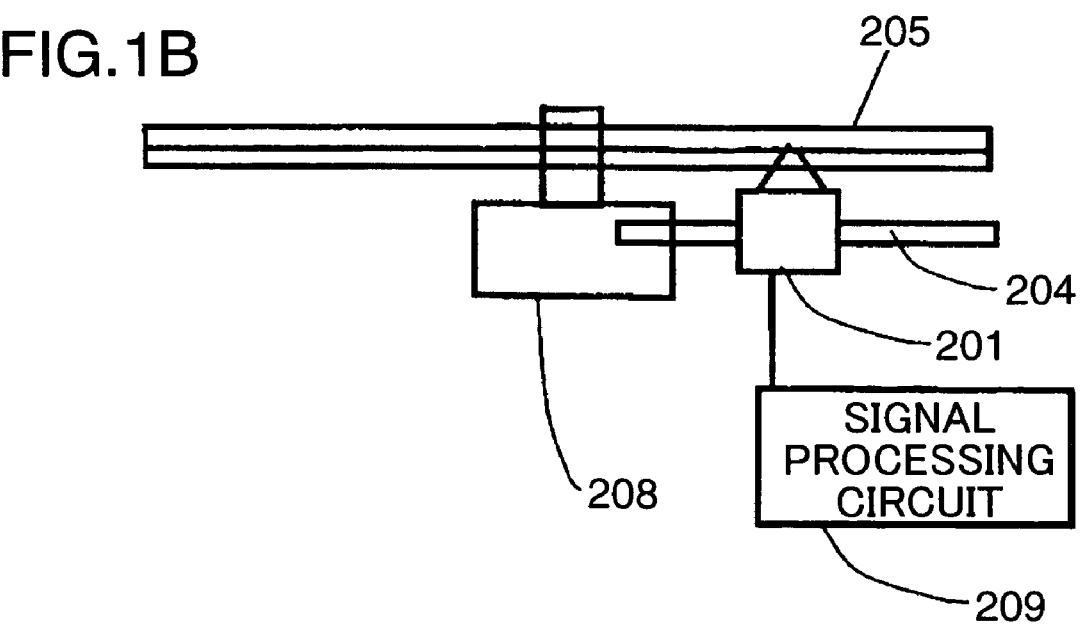
FIG. 1B is a schematic side view of the main part of the optical information apparatus.
Figure 14:
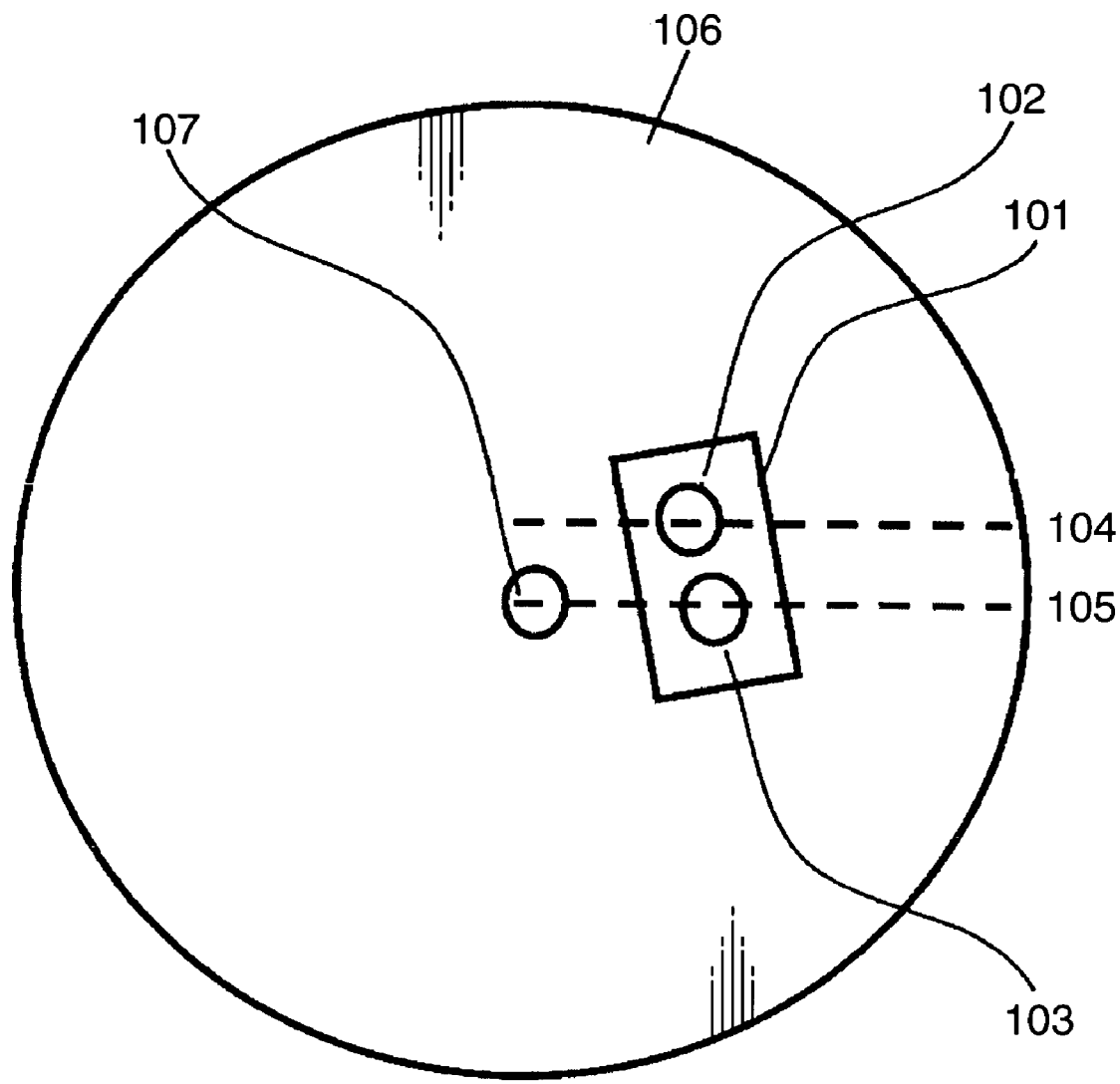
FIG. 14 is a top view of a conventional optical information apparatus, showing its configuration.
Figure 15:
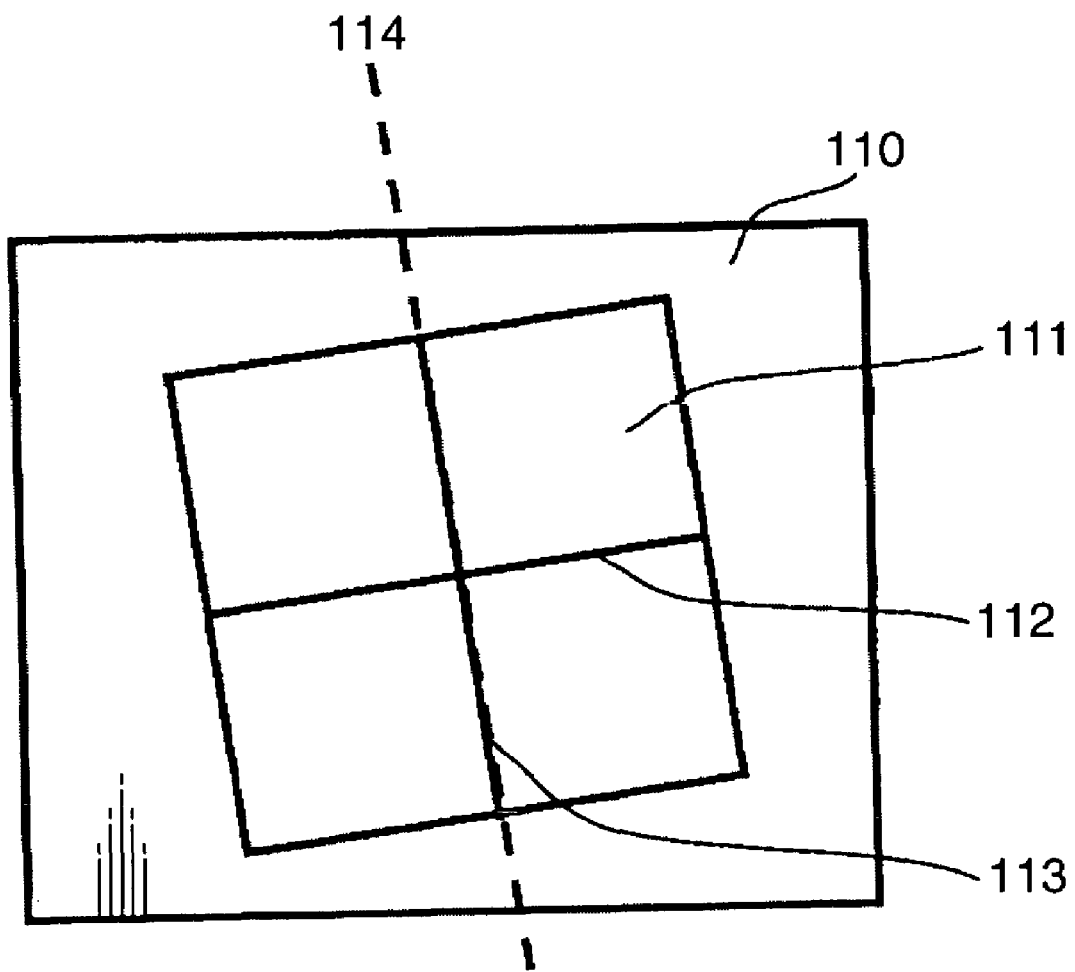
FIG. 15 is a schematic view of a photo-detector in the conventional optical information apparatus, conceptually showing the relation between a division line of the photo-detector and track-tangent directions.

FIGS. 1A and 1B schematically show the configuration of an optical information apparatus according to a first embodiment of the present invention. In FIGS. 1A and 1B, a description about the same component elements as those of FIGS. 14 and 15 is omitted.

In FIG. 1A, an optical head 201 includes a first objective lens (i.e., the light-concentrating means or the light-concentrating element) 202, and a second objective lens (i.e., the light-concentrating means or the light-concentrating element) 203. The optical head 201 is transferred from the inner circumference to the outer circumference of an optical disk (i.e., the information storage medium) 205 by a transfer mechanism (i.e., the transferring means) 204. At this time, the first objective lens 202 moves on a straight line 206, and the second objective lens 203 moves on a straight line 207 parallel to the straight line 206. In other words, the straight line 206 is a transfer line of the first objective lens 202, and the straight line 207 is a transfer line of the second objective lens 203. The optical disk 205 is rotated around its rotational center by a motor (i.e., the rotating means) 208. At this time, the rotational center of the motor 208 is located on the extension line of the transfer line 207, but it is not on the extension line of the transfer line 206. In other words, the transfer line 207 is a radius line of the optical disk 205, and thus, the second objective lens 203 is transferred at least between the innermost circumference and the outermost circumference of a recording area along this radius line 207. On the other hand, the transfer line 206 is shifted from the radius line 207, and thus, the first objective lens 202 is transferred at least between the innermost circumference and the outermost circumference of a recording area along this transfer line 206.

FIG. 1B is a schematic side view of the optical head 201 and the optical disk 205. The optical head 201 is moved from the inner circumference to the outer circumference of the optical disk 205 by the transfer mechanism 204. Besides, the optical disk 205 is rotated by the motor 208, so that a signal can be reproduced or recorded in any position on the optical disk 205. A signal which is outputted from the optical head 201 is subjected to a binary processing, an error correction or decoding processing by a signal processing circuit (i.e., the signal processing means) 209. The information which has undergone such a processing by the signal processing circuit 209 is outputted to a computer or the like through an external output interface (not shown). Or, it is outputted to an image processing circuit and processed there and then is reproduced as an image, or it is subjected to another such processing.

Figure 2A:
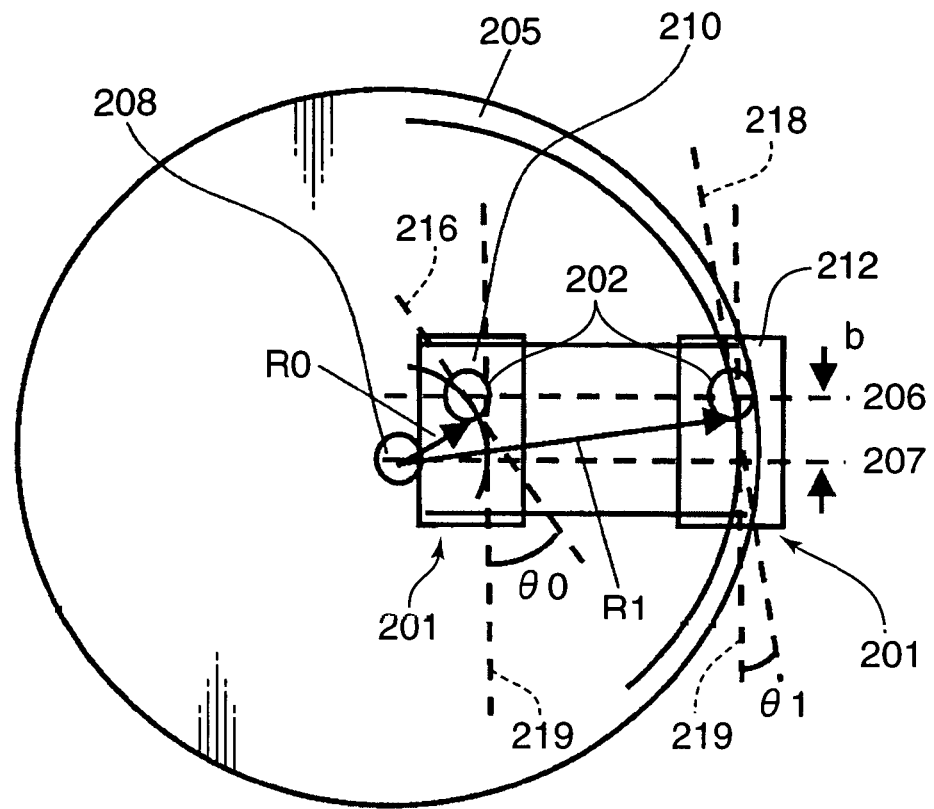
FIG. 2A is a top view of an optical head according to the first embodiment of the present invention, showing the relation between the optical head, an information recording medium and track-tangent directions.

FIG. 2A shows the cases in which the optical head 201 lies at an innermost circumference 210 in the recording area of the optical disk 205 and at an outermost circumference 212 in the recording area. In this figure, to make such a description simpler, the first objective lens 202 is only shown. In the position of the innermost circumference 210, the track is an arc whose radius is R0. In this position of the innermost circumference 210, a tangential line 216 tangential to the track on the transfer line 206 crosses, at an angle of θ0, a straight line (or the track's tangential line on the radius line 207) 219 perpendicular to the transfer line (or radius line) 207 of the second objective lens 203. If the distance between the transfer line 206 and the transfer line 207 is b, this θ0 is expressed in the following formula.

θ0=sin$^{-1}$(b/R0)

On the other hand, in the position of the outermost circumference 212, the track is an arc whose radius is R1. In this position of the outermost circumference 212, the directions of a tangential line 218 to the track on the transfer line 206 meets, at an angle of θ1, the track's tangential line at the transfer line 207. This θ1 is expressed in the following formula.

θ1=sin$^{-1}$(b/R1)

Figure 2B:
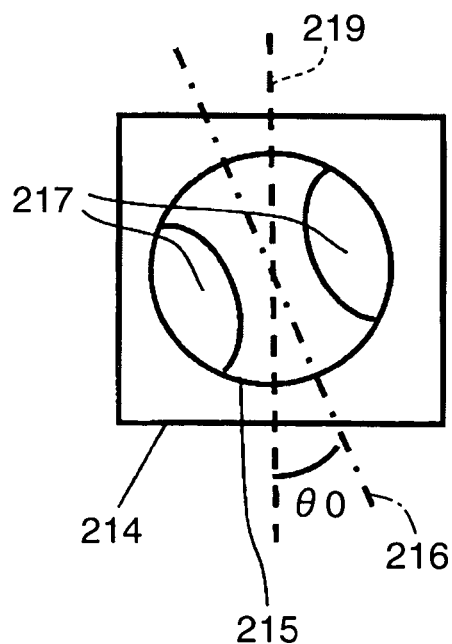
FIG. 2B is a schematic view of a photo-detector, conceptually showing the relation between an optical beam and track-tangent directions in a photo-detector when the optical head lies at the innermost circumference of a recording area.

FIG. 2B shows the case in which the first objective lens 202 is located in the position of the innermost circumference 210. This figure shows the light-receiving portion of a photo-detector 214, and an optical beam 215 which irradiates this light-receiving portion. The photo-detector 214 detects a beam of light which is reflected and diffracted by the optical disk 205. If seen in the directions of the optical axis, on the photo-detector 214, the tangential line 216 to the track on the transfer line 206 and the tangential line 219 to the track on the transfer line 207 intersect each other at an angle of θ0. A pair of areas 217 inside of the optical beam 215 represents areas in which the ± first-order beam of light and the zero-order beam of light of a diffracted beam of light by the track overlap each other. Herein, in FIGS. 2B and 2C, a division line (described later) is omitted for convenience.

Figure 2C:
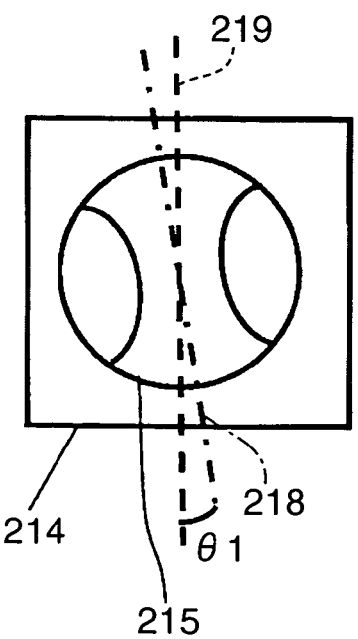
FIG. 2C is a schematic view of the photo-detector, conceptually showing the relation between an optical beam and track-tangent directions in the photo-detector when the optical head lies at the outermost circumference of the recording area.

FIG. 2C shows the case in which the first objective lens 202 is located in the position of the outermost circumference 212. If seen in the directions of the optical axis, on the photo-detector 214, the tangential line 218 tangential to the track on the transfer line 206 and the tangential line 219 tangential to the track on the transfer line 207 intersect each other at an angle of θ1. In this way, if the first objective lens 202 moves from the innermost circumference 210 to the outermost circumference 212, then on the photo-detector 214, the angle at which the tangential directions of the track on the transfer line 206 and the tangential line 219 on the transfer line 207 intersect each other, changes from θ0 to θ1. Herein, the angle θ1 is a smaller value than the angle θ0.

Figure 3:
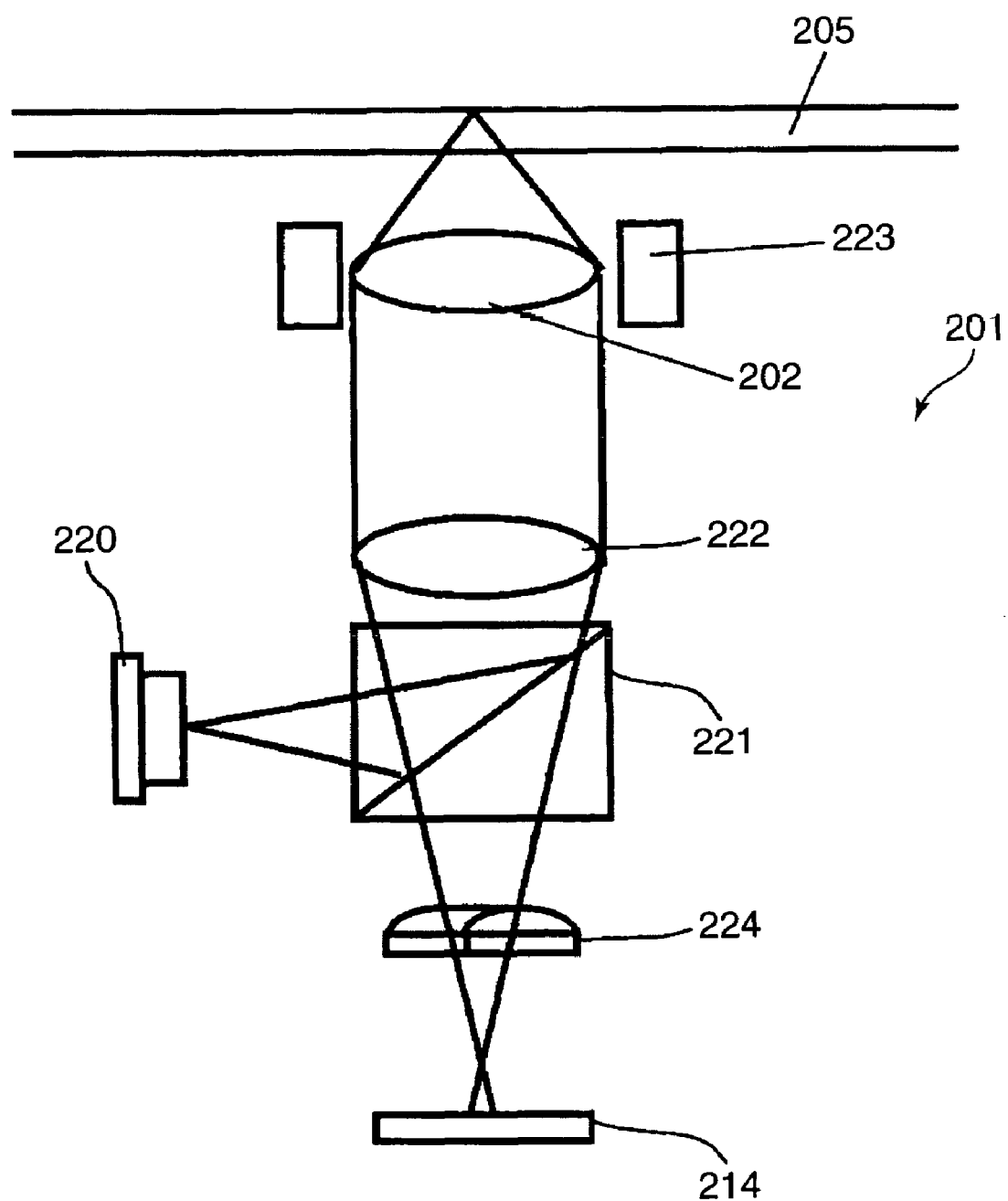
FIG. 3 is a schematic view of an optical system of the optical head according to the first embodiment of the present invention.

FIG. 3 simply shows a part of the configuration of an optical system of the optical head 201 according to this first embodiment. This figure shows the optical system on the side of the first objective lens 202. A beam of light which has been emitted from a semiconductor laser (i.e., the light source) 220 is reflected by the half-mirror surface of a beam splitter 221. This reflected beam of light is subjected to beam shaping by a collimator lens 222, so that it becomes a parallel beam of light. The parallel beam of light is concentrated by the first objective lens 202 and irradiates the optical disk 205.

The first objective lens 202 can be moved in the optical-axis directions and the radial directions by an actuator (i.e., the driving mechanism) 223. The first objective lens 202 is transferred by the actuator 223, so that it can follow a concentrated-light spot in the case where the surface of the optical disk 205 is warped or the track is de-centered.

The beam of light which has been reflected and diffracted by the optical disk 205 again passes through the first objective lens 202 and the collimator lens 222. This time, it penetrates the half-mirror surface of the beam splitter 221. The beam of light which has passed through the beam splitter 221 is given astigmatism by a cylindrical lens 224. Then, it is incident upon the photo-detector (i.e., the detecting means) 214. If the astigmatism is given to the beam of light by the cylindrical lens 224, then according to the distance between the optical disk 205 and the first objective lens 202, the shape of the beam of light which has irradiated the photo-detector 214 is changed into a long ellipse. Then, its quality and polarity are detected, so that a focus error signal can be obtained. This is a focus detection method which is known as the astigmatic method.

In the case of the detector mentioned as the prior art shown in FIG. 15, a signal by a phase-difference method or a signal by a push-pull method can only be obtained as a tracking signal. In a phase-difference method, a tracking signal can be obtained only in a disk where a signal is recorded by a pit row or the like. Hence, if no record is made in an optical disk for recording or the like, a tracking signal cannot be obtained. On the other hand, in a push-pull method, when an objective lens follows a disk's de-centrality and makes a lens shift, an offset can be produced in a tracking signal. This makes it difficult to execute stable tracking control.

In contrast, there is tracking control by an advanced push-pull method (or APP method). In this method, a far-field image is split into a first area which mainly includes a tracking signal and a second area which does not include a tracking-signal component and includes a lens-shift component. Then, a signal in the first area is corrected using a signal in the second area.

Figure 4A:
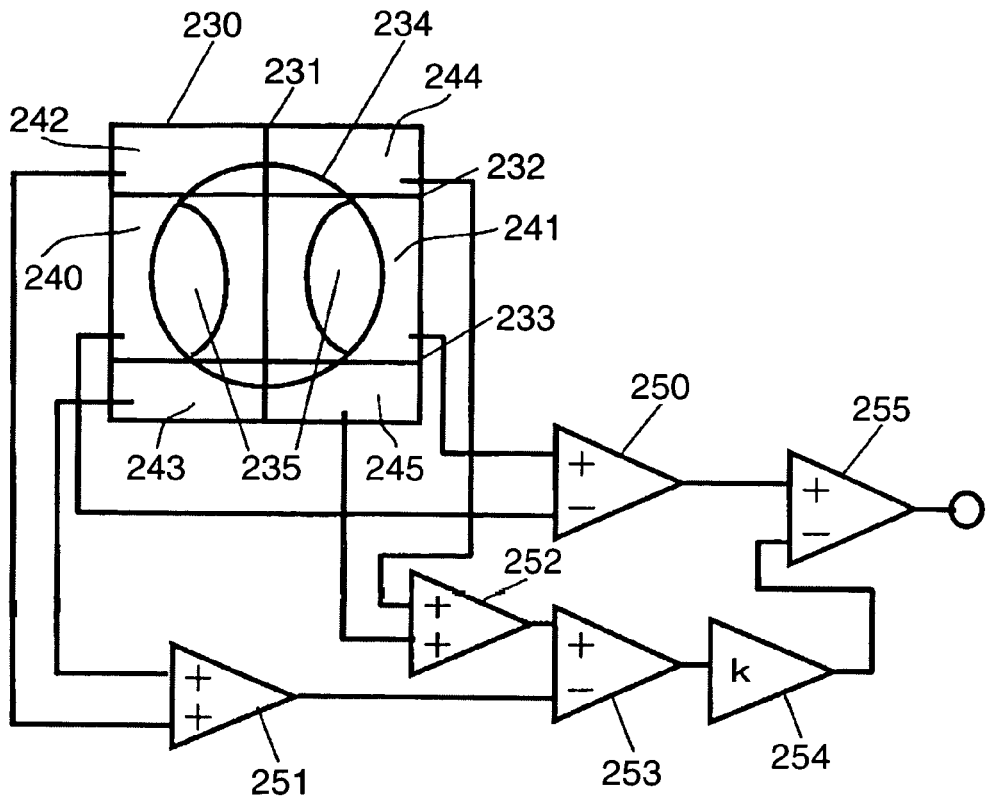
FIG. 4A is a schematic view of a photo-detector according to a prior art, conceptually showing a division line and an arithmetic circuit.

FIG. 4A shows an example of the light-receiving portion and arithmetic circuit of a photo-detector 230 according to a conventional disposition which is used in the APP method. This figure shows an example of the case where an objective lens is used which is provided on a radius line that passes through the rotational center of a motor. As shown in FIG. 4A, the light-receiving portion of the photo-detector 230 is divided into six areas 240 to 245 by three division lines 231, 232, 233. The division line 231 is set parallel to the tangential directions of the track on the radius line. The division lines 232, 233 are perpendicular to the division line 231 and are parallel to each other. The division lines 232, 233 are in the directions parallel to the transfer directions of an optical head.

An area 235 inside of an optical beam 234 which is received in the area 240 and the area 241 represents an area in which the ±first-order beam of light and the zero-order beam of light of a diffracted beam of light by the track when it is reflected by an optical disk overlap each other. When a concentrated-light spot on the optical disk crosses the track, the quantity of a beam of light which is received in this area 235 is mainly changed. Hence, the area 240 and the area 241 between the division line 232 and the division line 233 are areas in which the optical beam 234 that mainly includes a tracking component is received.

On the other hand, the optical beam 234 which is received in the areas 242, 243, 244, 245 includes no tracking component. Herein, if a lens shift is produced in the objective lens, the optical beam 234 is displaced in the right-and-left directions of FIG. 4A. Thereby, the quantity of a beam of light which is received in the areas 242, 243, 244, 245 is changed, and thus, the optical beam 234 which is received in these areas mainly includes a lens-shift component.

A signal which is outputted according to the quantity of a beam of light that is received in the area 240 and the area 241 is inputted in a differential circuit 250. Then, its difference signal is outputted from the differential circuit 250. The difference signal which is outputted from the differential circuit 250 is a signal which mainly indicates the positional relation between a concentrated-light spot and the track. However, it is also affected by a lens shift.

A signal which is outputted according to the quantity of a beam of light that is received in the area 242 and the area 243 is inputted in an addition circuit 251. Then, its sum signal is outputted from the addition circuit 251. In addition, a signal which is outputted according to the quantity of a beam of light that is received in the area 244 and the area 245 is inputted in an addition circuit 252. Then, its sum signal is outputted from the addition circuit 252. Next, the output signals of the addition circuit 251 and the addition circuit 252 are inputted in a differential circuit 253. Then, its difference signal is outputted from the differential circuit 253. This signal which is outputted from the differential circuit 253 undergoes no change, even though the positional relation between a concentrated-light spot and the track is changed. It is changed according to a lens shift. Then, the signal which is outputted from the differential circuit 253 is inputted in a variable gain-amplification circuit 254. Then, using k as a predetermined constant, a signal which is $\underline{k}$ times as great as it is outputted from the variable gain-amplification circuit 254. Sequentially, the signal which is outputted from the differential circuit 250 and the signal which is outputted from the variable gain-amplification circuit 254 are inputted in a differential circuit 255. In this differential circuit 255, the output signal from the variable gain-amplification circuit 254 is subtracted from the output signal from the differential circuit 250. Thereby, the signal which includes only a lens-shift component is multiplied by a predetermined constant and is subtracted from the signal which mainly includes a tracking component and also includes a lens-shift component. Consequently, a tracking signal can be generated which includes only a tracking signal and undergoes no change by a lens shift. The signal which is generated in this way is a tracking error signal by the APP method. In the tracking error signal which is obtained as described above, no offset is caused even though there is a lens shift. This makes it possible to execute a stable tracking control.

Figure 4B:
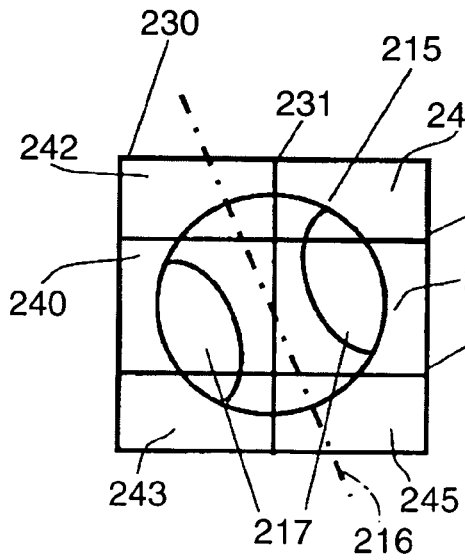
FIG. 4B is a schematic view of a photo-detector, conceptually showing the relation between a division line of the photo-detector, an optical beam and track-tangent directions according to the prior art when an optical head lies at the innermost circumference.
Figure 4C:
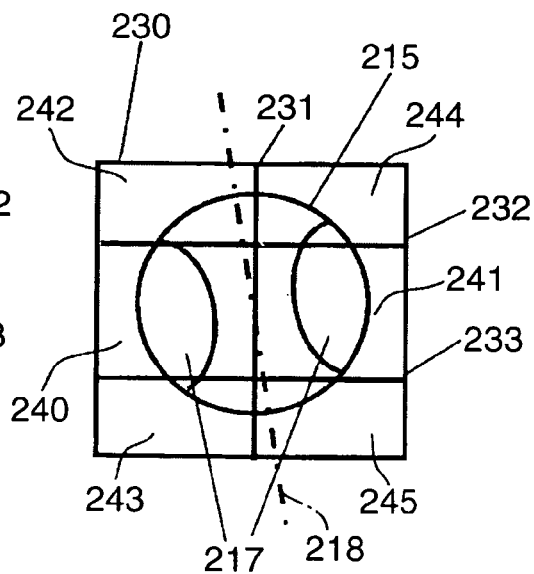
FIG. 4C is a schematic view of the photo-detector, conceptually showing the relation between the division line of the photo-detector, an optical beam and track-tangent directions according to the prior art when the optical head lies at the outermost circumference.

In contrast, as shown in FIG. 1A, if the first objective lens 202 is used which is transferred on the transfer line 206 that is shifted from the radius line 207, as shown in FIG. 2A, when the optical head 201 is transferred between the inner circumference and the outer circumference, a change is made in the tangential directions of the track on the transfer line 206. Therefore, as shown in FIGS. 4B and 4C, with respect to the areas 217 of the optical beam 215 in which the ±first-order beam of light and the zero-order beam of light of a diffracted beam of light by the track overlap each other, a beam of light is received not only within the area 240 and the area 241 but also beyond them. In other words, the areas 217 enter the areas 242 to 245 where a beam of light that does not naturally include a tracking component is received. This entry causes a signal which is outputted from the areas 242 to 245 to include a tracking component. If the arithmetic for correcting a lens-shift component is executed as described above, that can also offset a part of a tracking component. Hence, when the tangential directions of the track are changed, the amplitude of a tracking signal by the APP method becomes shorter. Thereby, a gain is reduced in tracking control, thus making the tracking control unstable.

FIG. 5 shows a change in the amplitude of a tracking signal when a concentrated-light spot moves from the innermost circumference (i.e., the radius position=R0) to the outermost circumference (i.e., the radius position=R1) in a conventional division-line disposition. As can be seen, as the track is rotated, the amplitude of a tracking signal becomes smaller.

Figure 6A:
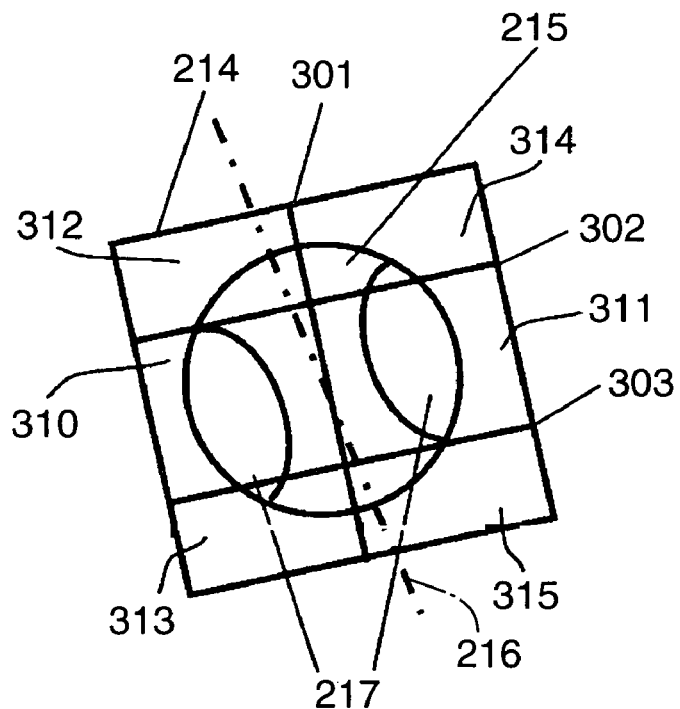
FIG. 6A is a schematic view of the photo-detector, conceptually showing the relation between a division line of the photo-detector, an optical beam and track-tangent directions according to the first embodiment of the present invention when the optical head lies at the innermost circumference.
Figure 6B:
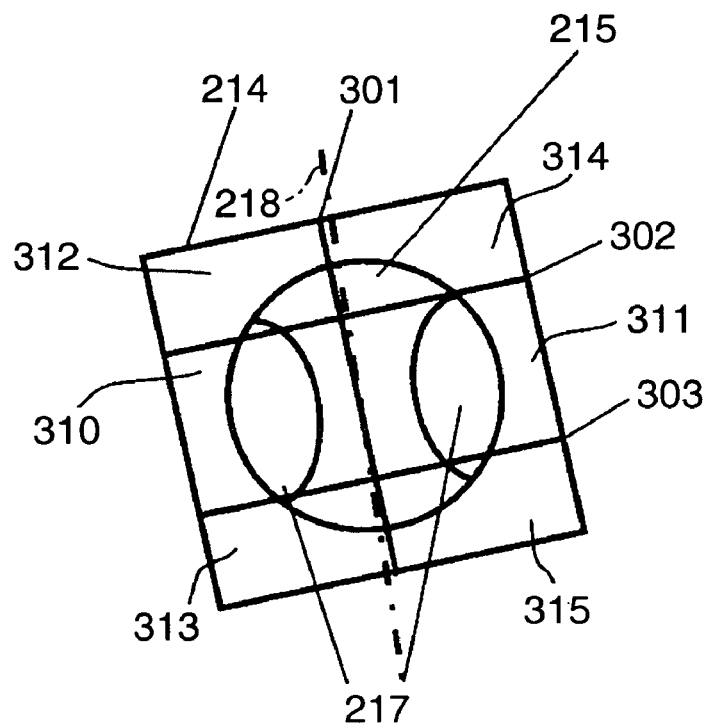
FIG. 6B is a schematic view of the optical head, conceptually showing the relation between the division line of the photo-detector, an optical beam and track-tangent directions according to the first embodiment of the present invention when the optical head lies at the outermost circumference.

Next, FIGS. 6A and 6B show the relation between a division line and a spot of the photo-detector 214 according to this first embodiment. FIG. 6A shows a state in which a concentrated-light spot by the first objective lens 202 is located at the innermost circumference 210 in the recording area. At this time, the angle at which the tangential line 216 to the track meets the tangential line 219 to the track on the transfer line 207 is θ0 and wide.

The light-receiving portion of the photo-detector 214 is divided into six areas 310 to 315 by a division line 301 and two lateral division lines 302, 303. The division line 301 is set parallel to the tangential directions of the track on the transfer line 206 in the middle in radius directions of the recording area. Specifically, the division line 301 inclines to the tangential line 219 to the track on the radius line 207 at the average angle of the angle θ0 at which the tangential line 216 to the track at the innermost circumference 210 crosses the tangential line 219 to the track on the radius line 207 and the angle θ1 at which the tangential line 218 to the track at the outermost circumference 212 crosses the tangential line 219 to the track on the radius line 207. As a result, the division line 301 is set in the direction which divide in two (i.e., halve the angle) the angle at which the tangential direction of the track on the transfer line 206 at the outermost circumference 212 of the recording area meets the tangential directions of the track on the transfer line 206 at the innermost circumference 210 of the recording area.

The lateral division line 302 and the lateral division line 303 are disposed to be perpendicular to the division line 301. In other words, the lateral division lines 302, 303 are set perpendicular to the tangential directions of the track on the transfer line 206 in the middle in radius directions of the recording area. In the case where the pair of areas 217 inside of the optical beam 215 in which the ±first-order beam of light and the zero-order beam of light of a diffracted beam of light by the track overlap each other are disposed in the directions parallel to the lateral division lines 302, 303, the interval between the lateral division line 302 and the lateral division line 303 is set at an interval inside of which these areas 217 are exactly included. In other words, the lateral division line 302 and the lateral division line 303 divide the light-receiving portion into the first areas 310, 311 on which a beam of light that mainly includes a tracking component is incident and the second areas 312 to 315 which on which a beam of light that does not include a tracking component is incident.

In the area 310 and the area 311 between the lateral division line 302 and the lateral division line 303, a signal which mainly includes a tracking component is obtained. On the other hand, in the areas 312 to 315 outside of both lateral division line 302 and lateral division line 303, a signal which mainly includes a component (i.e., a lens-shift component) that is changed by a lens shift is obtained. Then, arithmetic is executed for them in the same way as the arithmetic circuit shown in FIG. 4A. Thereby, a tracking error signal in the APP method can be obtained.

A part of the area 217 inside of the optical beam 215 in which the ±first-order beam of light and the zero-order beam of light of a diffracted beam of light by the track overlap each other, enters the areas 313 to 315 outside of the lateral division lines 302, 303, during the period when a concentrated-light spot moves from the innermost circumference 210 to the outermost circumference 212. However, its quantity is smaller than that of FIG. 4A. In other words, FIG. 6B shows a state in which a concentrated-light spot is located at the outermost circumference 212 in the recording area, but at this time, the inclination of a tangential line 218 with the division line 301 is gentler than that of a tangential line 218 with the division line 231 shown in FIG. 4C. Therefore, even if a part of the area 217 inside of the optical beam 215 in which the ±first-order beam of light and the zero-order beam of light of a diffracted beam of light by the track overlap each other enters the area 312 and the area 315, its quantity is small. In FIG. 6A, in the same way, a part of the area 217 enters the areas 313 to 314, but its quantity is also small.

Hence, the division line 301 is disposed to incline at the average angle of the angle θ0 and the angle θ1 to the tangential line 219 to the track on the radius line 207. Thereby, at each of the innermost circumference 210 and the outermost circumference 212, the area which the diffracted-light overlapping area 217 enters is different from each other and its quantity is smaller. This helps keep the amplitude of a tracking signal from being narrower.

Figure 7:
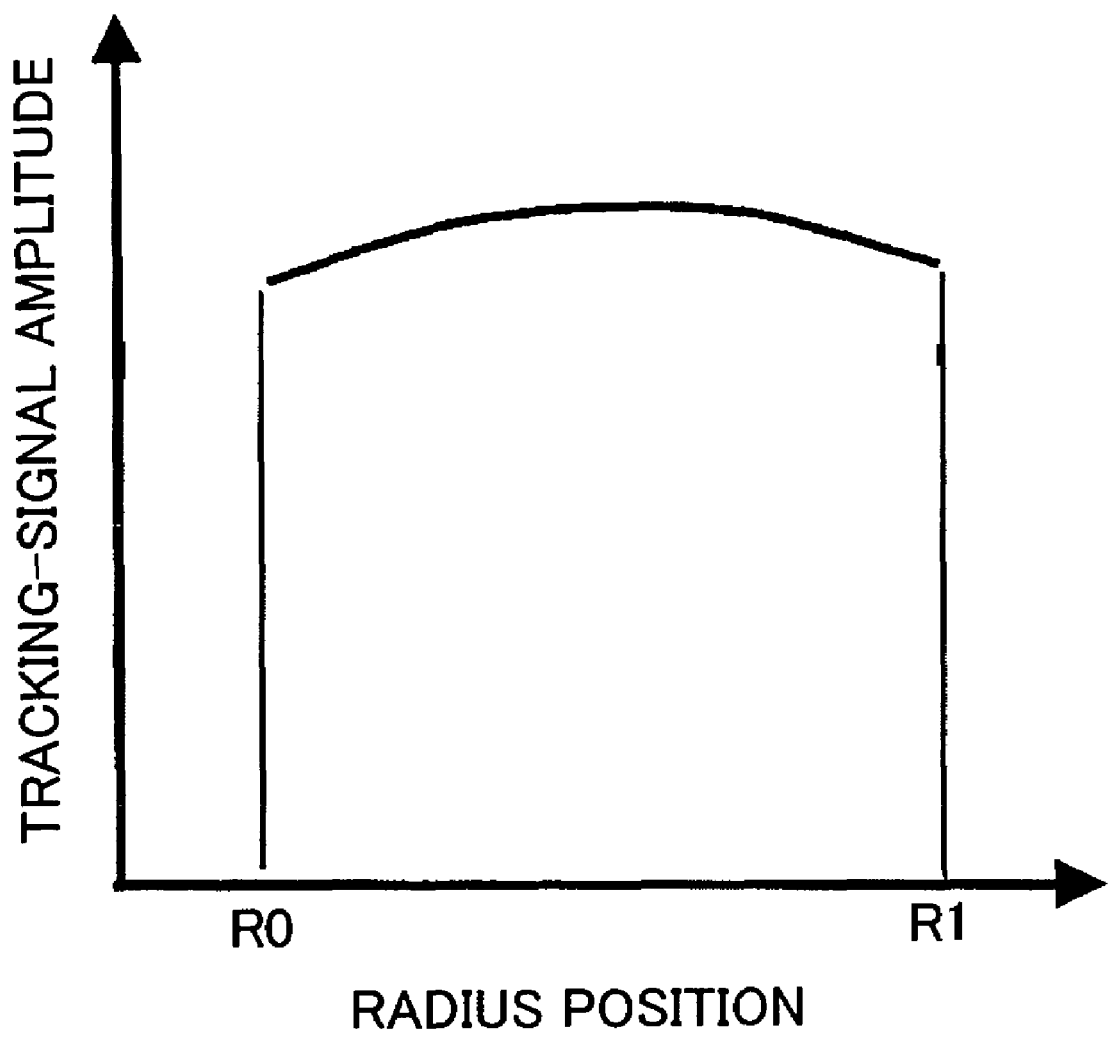
FIG. 7 is a graphical representation, characteristically showing the correlation between the position of a concentrated-light spot and the amplitude of a tracking signal in the optical head according to the first embodiment of the present invention.

FIG. 7 shows a change in the amplitude of a tracking signal when a concentrated-light spot moves from the innermost circumference 210 or the position of the radius R0 to the outermost circumference 212 or the position of the radius R1 in the case of the division-line disposition according to this first embodiment. As can be seen, the amplitude reaches to the maximum in the middle position of the radius directions. On the other hand, it becomes narrower at the inner circumference and the outer circumference, but its reduction quantity is small.

As described so far, in a photo-detector of the APP method, if the division line 301 is disposed to incline at the average angle in the innermost circumference 210 and the outermost circumference 212, the length of a change in the amplitude of a tracking error signal can be reduced. This makes it possible to realize a stable tracking control.

Herein, in this first embodiment, the inclination angle of a division line is the average angle of the angle θ0 and the angle θ1. However, if θ satisfies θ0≧θ≧θ1, the variation in the amplitude of a tracking signal can be kept down. Hence, θ can be arbitrarily adopted as long as it meets such a formula. Except for this, the division line 301 can also be set in the directions parallel to the track's tangential directions in the middle in radius directions of a recording area. This track in the radius-direction middle means the track in the average radius position of the radius at the innermost circumference 210 of the recording area and the radius at the outermost circumference 212 of the recording area.

Herein, in this first embodiment, a focus detection is executed by the astigmatic method. However, the present invention is not limited to this. A spot-size method, a knife-edge method, or the like, may also be used.

Second Embodiment

Figure 8:
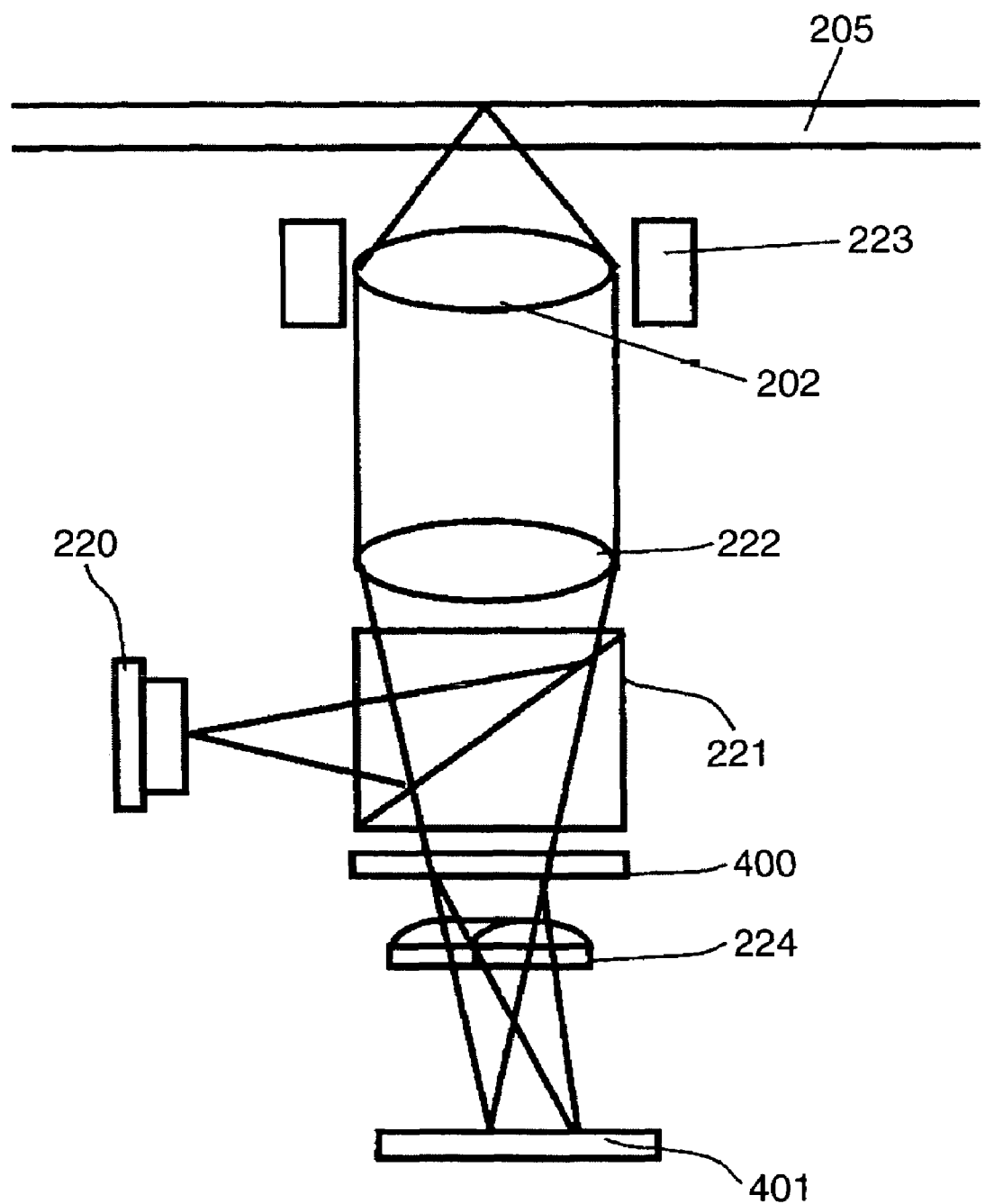
FIG. 8 is a schematic view of an optical system of an optical head according to a second embodiment of the present invention.

FIG. 8 schematically shows an optical head according to a second embodiment of the present invention. In this second embodiment, an optical beam which returns from the optical disk 205 is split by a hologram element 400 as an example of the splitting means. In FIG. 8, the same component elements as those of FIG. 1 and FIG. 3 are given the identical reference numerals, and thus, their description is omitted.

In FIG. 8, the hologram element 400 splits the optical beam which has been reflected by the optical disk 205 and has passed through by the collimator lens 222 and the beam splitter 221. Then, it diffracts an optical beam which is a part of it and changes the direction in which it goes ahead. The optical beam which has been diffracted by the hologram element 400 and the optical beam which has gone straight without being diffracted are given astigmatism by the cylindrical lens 224. Then, it is received by a photo-detector (i.e., the detecting means) 401.

Figure 9A:
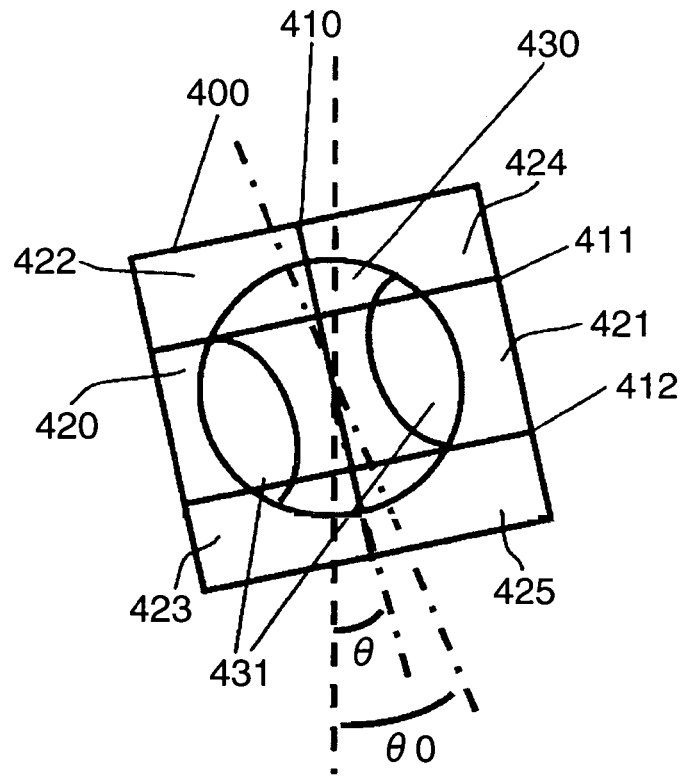
FIG. 9A is a schematic view of a hologram element, conceptually showing the positional relation between a division line of the hologram element, an optical beam and track-tangent directions according to the second embodiment of the present invention when the optical head lies at the innermost circumference.

FIG. 9A is a plan view of the hologram element 400. As shown in this figure, the light-passage area of the hologram element 400 is divided into several areas. Specifically, the hologram element 400 is divided into six areas 420 to 425 by a division line 410 and two lateral division lines 411, 412. Each area 420 to 425 is configured to have different light-diffraction directions. Herein, FIG. 9A shows a state in which the optical head is located in the innermost-circumference position of the recording area.

The division line 410 is set parallel to the tangential directions of the track in a predetermined position of the recording area on the transfer line 206. Specifically, if the angle at which the tangential line 216 to the track at the innermost circumference 210 crosses the straight line perpendicular to the radius line 207 is θ0 and the angle at which the tangential line 218 to the track at the outermost circumference 212 crosses the straight line perpendicular to the radius line 207 is θ1, then the division line 410 is set so that the inclination angle θ of the division line 410 to the track's tangential line at the radius line 207 satisfies θ0≧θ≧θ1, if seen in the optical-axis directions. Preferably, the inclination angle θ of the division line 410 should be the average angle of the angle θ0 and the angle θ1.

The lateral division line 411 and the lateral division line 412 are disposed to be perpendicular to the division line 410. In the case where the pair of areas 217 inside of an optical beam 430 in which the ±first-order beam of light and the zero-order beam of light of a diffracted beam of light by the track overlap each other are disposed in the directions parallel to the lateral division lines 411, 412, the interval between the lateral division line 411 and the lateral division line 412 is set at an interval inside of which these areas 217 are exactly included. In other words, the lateral division line 411 and the lateral division line 412 divide the light-passage area into a first areas on which a beam of light that mainly includes a tracking component is incident and a second areas on which a beam of light that does not include a tracking component is incident.

When the optical head lies at the innermost circumference, the track's tangential line is inclined at an angle of θ0 with the straight line perpendicular to the radius line 207. According to this inclination, an area 431 in which the ±first-order beam of light and the zero-order beam of light by the diffraction of the track overlap each other, is also inclined. On the other hand, the division line 410 is also inclined at an angle of θ.

Figure 9B:
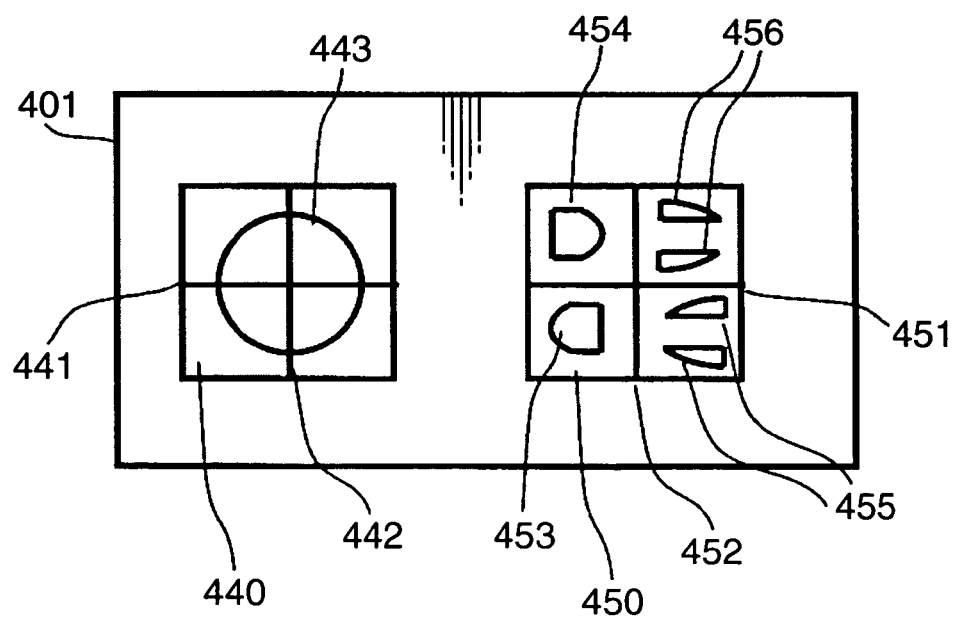
FIG. 9B is a schematic view of the hologram element, conceptually showing the positional relation between the division line of the hologram element, an optical beam and track-tangent directions according to the second embodiment of the present invention when the optical head lies at the outermost circumference.

FIG. 9B shows light-receiving portions 440, 450 of the photo-detector 401, and beams of light 443, 453 which are received by these light-receiving portions 440, 450. The light-receiving portion 440 is divided into four areas by two division lines 441, 442. The beam of light 443 which has penetrated the hologram element 400 is located to irradiate, as its center, the intersection point of the division line 441 and the division line 442. The arithmetic for a signal obtained from the light-receiving portion 440 is executed, so that a focus signal can be obtained in the same way as the first embodiment.

On the other hand, the light-receiving portion 450 is divided into four areas by two division lines 451, 452. In each area, the beam of light which has been split and diffracted by the hologram element 400 is received. The beam of light 453 is the beam of light which has passed through the area 420 of the hologram element 400. A beam of light 454 is the beam of light which has passed through the area 421 of the hologram element 400. A beam of light 455 is the beam of light which has passed through the area 422 and the area 423 of the hologram element 400. A beam of light 456 is the beam of light which has passed through the area 424 and the area 425 of the hologram element 400.

The differential is taken between a signal which is outputted from a detection area where the beam of light 453 is received and a signal which is outputted from a detection area where the beam of light 454 is received. Thereby, a signal which mainly includes a tracking component can be obtained. Besides, the differential is taken between a signal which is outputted from a detection area where the beam of light 455 is received and a signal which is outputted from a detection area where the beam of light 456 is received. Thereby, a signal which mainly includes a lens-shift component can be obtained. These signals are subjected to arithmetic, so that an influence of a lens shift can be cancelled. Even if there is a lens shift, a tracking error signal in which no offset is produced can be obtained.

In this second embodiment, during the period when the optical head moves from the innermost circumference to the outermost circumference, a tracking component can be kept to some extent from entering the area where the beams of light 455, 456 which mainly include a lens-shift component are received. Thereby, the amplitude of a tacking error signal in the APP method can be restrained from being small, thus realizing a stable tracking control.

In this second embodiment, a beam of light is split into several beams of light by the hologram element 400. This helps prevent the configuration of the photo-detector 401 from being complicated. In addition, the glass surface of the hologram element 400 is processed, so that a plurality of areas can be easily formed.

Figure 10:
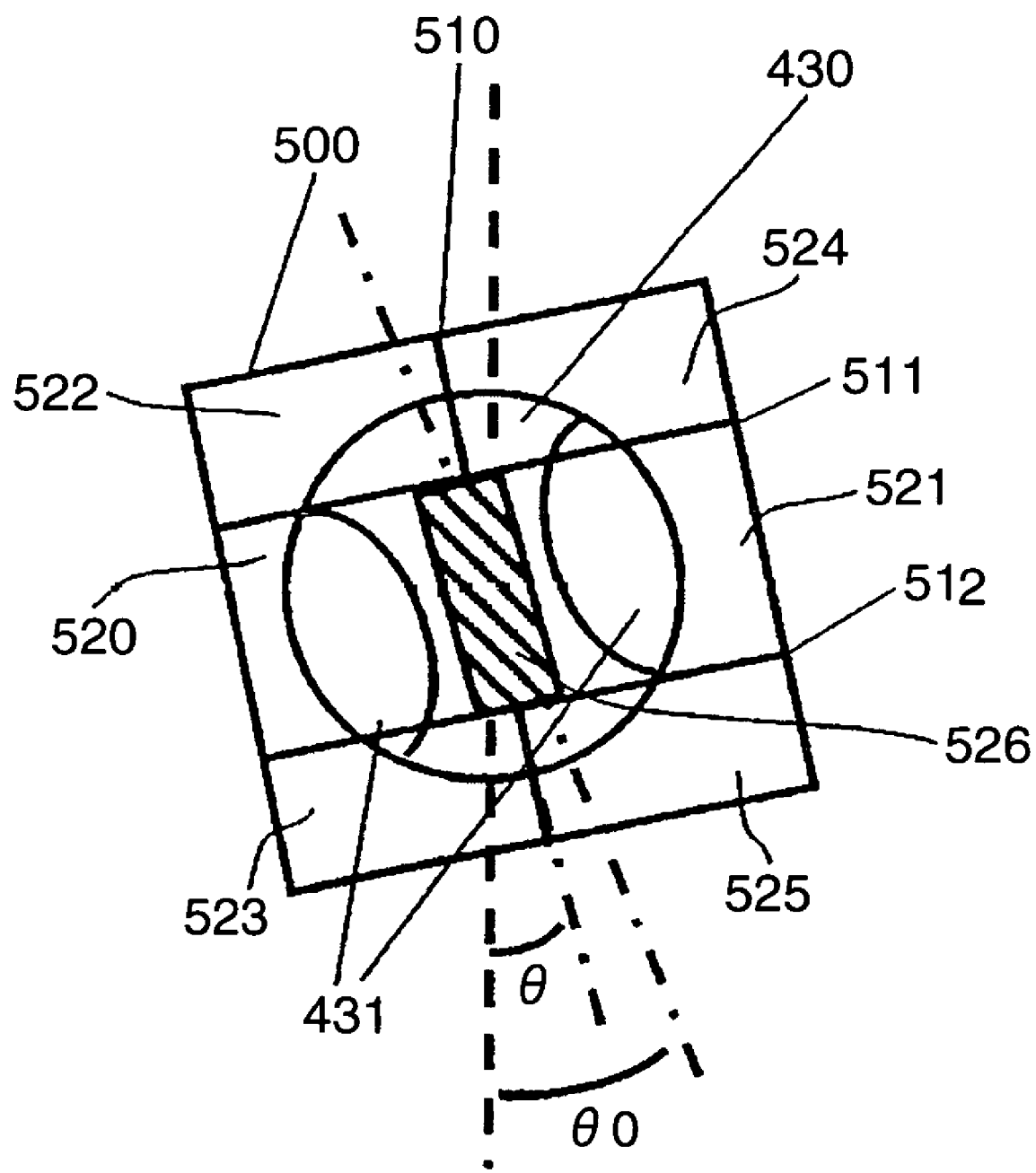
FIG. 10 is a schematic view of a hologram element, conceptually showing the positional relation between a division line of the hologram element, an optical beam and track-tangent directions according to another example of the second embodiment of the present invention when the optical head lies at the innermost circumference.

FIG. 10 shows an example in which a hologram element according to another embodiment is used. A hologram element (i.e., the splitting means) 500 of FIG. 10 is used instead of the hologram element 400 in the optical system of FIG. 8.

The hologram element 500 is different from the hologram element 400, in respect of having a dummy area in its middle part. The hologram element 500 is divided into six areas 520 to 525 by a division line 510 and two lateral division lines 511, 512 which are perpendicular to this division line 510. Besides, the hologram element 500 includes a dummy area 526 in its middle part or between the area 520 and the area 521. This dummy area 526 is designed so that a beam of light which passes through it goes in directions where the beam of light is not received by the light-receiving portion of the photo-detector 401. Therefore, the beam of light which has passed through the dummy area 526 does not contribute to the generation of a tracking signal. Thereby, without reducing the tracking component of a beam of light which is received in the areas 520, 521, the DC component can be decreased. Hence, according to this embodiment, a more stable tracking error signal can be obtained. In addition, the dummy area 526 is provided, thus preventing the stray light of a diffracted beam of light from entering the light-receiving portion of the photo-detector 401.

In this embodiment, if seen in the optical-axis directions, the inclination angle θ of the division line 510 to the track's tangential line on the transfer line 207 is set to satisfy θ0≧θ≧θ1. It is preferable that the inclination angle θ of the division line 510 be the average angle of the angle θ0 and the angle θ1.

Figure 11:
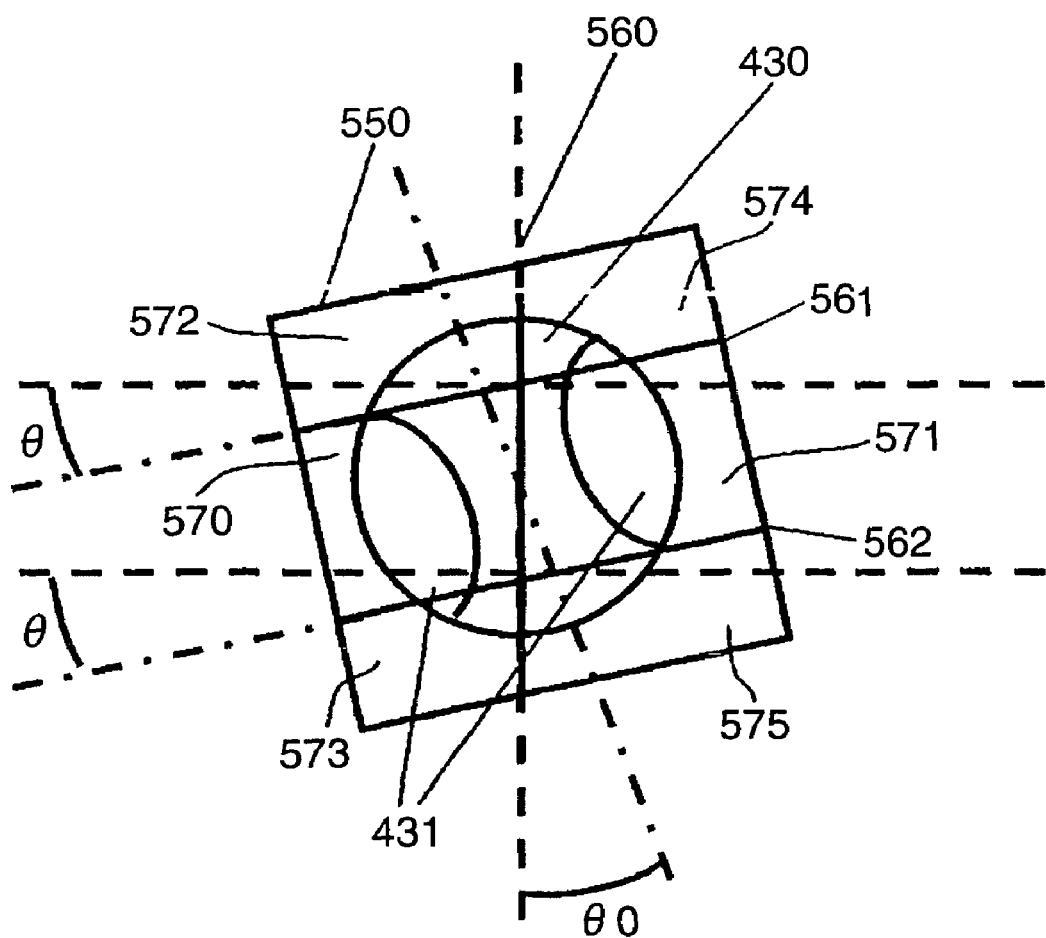
FIG. 11 is a schematic view of a hologram element, conceptually showing the positional relation between a division line of the hologram element, an optical beam and track-tangent directions according to still another example of the second embodiment of the present invention when the optical head lies at the innermost circumference.

FIG. 11 shows another form of a hologram element (i.e., the splitting means) 550. This hologram element 550 can be used instead of the hologram element 400.

The hologram element 550 is divided into six areas 570 to 575 by a division line 560 and two lateral division lines 561, 562 which intersects this division line 560. This hologram element 550 is different from the hologram element 400 in the following respect. The division line 560 is in the directions parallel to a projected line of the track's tangential line on the radius line 207 shown in FIG. 1 onto the hologram element 550. The lateral division line 561 and the lateral division line 562 intersect at an angle of (90+θ) degrees with the division line 560. In short, they are disposed at the angle which corresponds to the inclination of the track's tangential line. This θ is set to satisfy θ0≧θ≧θ1.

The tracking component which is naturally in the area 570 and the area 571 leaks into the areas 572 to 575 by the inclination of the track's tangential line when it goes across the lateral division line 561 and the lateral division line 562. In other words, in this embodiment, the lateral division line 561 and the lateral division line 562 should only correspond to the inclination of the track's tangential line, and thus, the division line 560 is not directly related. Therefore, if the division line 560 is not inclined and only the lateral division line 561 and the lateral division line 562 is inclined, then in the same way as the above described embodiments, an advantage can be obtained in that the amplitude of a tracking signal can be kept from narrowing.

Third Embodiment

Figure 12:
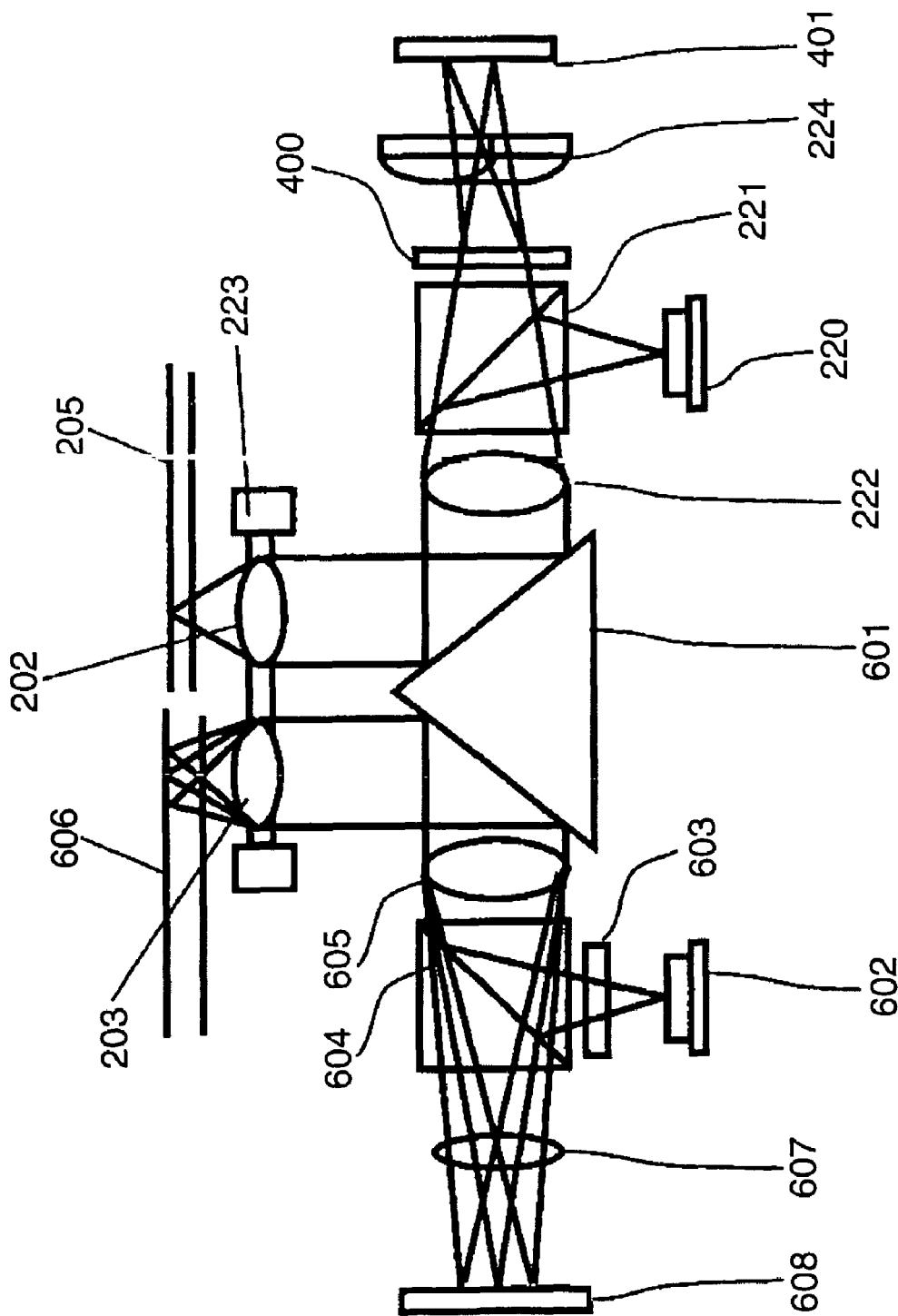
FIG. 12 is a schematic view of an optical system of an optical head according to a third embodiment of the present invention.

FIG. 12 schematically shows the main part of an optical information apparatus which is provided with an optical head 610 according to a third embodiment of the present invention. In this FIG. 12, the same component elements as those of FIG. 1 and FIG. 3 are given the identical reference numerals, and thus, their description is omitted.

A beam of light which is emitted from the semiconductor laser (i.e., the light source) 220 is reflected by the beam splitter 221. Then, it passes through the collimator lens 222 and is reflected by a raising prism 601. Next, it is concentrated by the first objective lens 202 and irradiates the optical disk 205. The beam of light which is reflected and diffracted by the optical disk 205 follows the same path again and passes through the beam splitter 221. Then, a part of it is diffracted by the hologram element 400 and penetrates the cylindrical lens 224. Thereafter, it is received by the photo-detector 401.

On the other hand, a part of a beam of light which is emitted from a semiconductor laser (i.e., the light source) 602 is diffracted mainly into three beams by a diffraction grating 603 for three-beam generation. These three beams are reflected by a beam splitter 604 and are transformed into parallel beams of light by a collimator lens 605. Then, they are reflected by the raising prism 601. This beam of light is concentrated by the second objective lens 203 and irradiates an optical disk 606. The beam of light which is reflected and diffracted by the optical disk 606 again passes through the second objective lens 203, the raising prism 601 and the collimator lens 605. Then, it penetrates the beam splitter 604, passes through a detection lens 607 and is received by a photo-detector 608.

The three beams which irradiate the optical disk 606 are disposed oblique to the track. Then, the photo-detector 608 receives these three beams separately and generates a tracking signal. This is known as a three-beam method.

The semiconductor laser 220 and the semiconductor laser 602 each emit a beam of light which has a different wavelength. The optical disk 205 and the optical disk 606 are a disk which is different in standards from each other. Specifically, the optical disk 205 and the optical disk 606 differ in the thickness of a protective layer, a track pitch, the recording density for information, or the like. The first objective lens 202 and the second objective lens 203 are objective lenses which correspond to the optical disks 205 and 606, respectively.

In this example, the first objective lens 202 and the second objective lens 203 are driven by the same actuator 223. According to this configuration, optical heads which correspond to two optical disks whose standards are different can be integrated into one unit. This helps make the apparatus smaller. The second objective lens 203 is placed on the radius line 207, and thus, as the tracking control for this second objective lens 203, tracking control in a conventional three-beam method can be used. Besides, a CD module can be used which is formed by incorporating the three-beam generation diffraction grating 603 into the semiconductor laser 602 or the like. This retrains the optical system from being complicated.

Furthermore, let's assume that the semiconductor laser 602 is a dual-wavelength laser which can emit two kinds of beams of light whose wavelengths are 780 nm and 660 nm, and the second objective lens 203 is a lens which can be used for protective-layer thicknesses of 0.6 mm and 1.2 mm. If so, simply by using the left-hand system of FIG. 12, information can be recorded or reproduced in or from a CD and a DVD. In this case, the second objective lens 203 is configured to concentrate an infrared laser beam or a red laser beam. On the other hand, if the semiconductor laser 220 is a laser which can emit a beam of light whose wavelength is 405 nm, and the first objective lens 202 is a lens which can be used for a protective-layer thickness of 0.1 mm, it can also be used for a high-density optical disk. In this case, the first objective lens 202 is configured to concentrate a blue laser beam. In this optical system, tracking control is executed using a single beam, thus heightening the usage efficiency of a blue laser beam. Hence, the optical head which is applied to three different standards can be made smaller.

Figure 13:
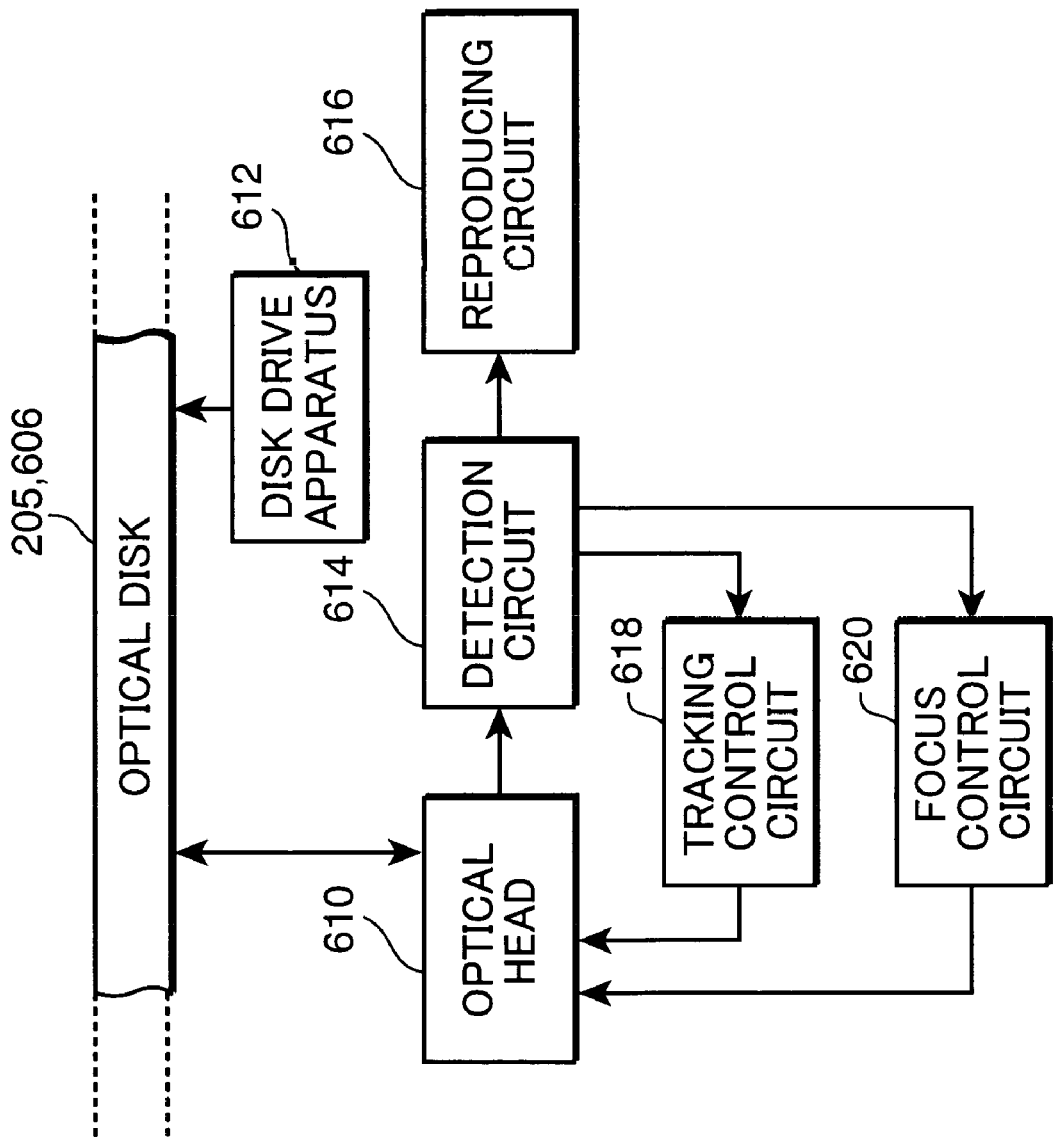
FIG. 13 is a block diagram, schematically showing a control system of an optical information apparatus according to the third embodiment of the present invention.

FIG. 13 is a block diagram, schematically showing a control circuit system of an optical information apparatus. This optical information apparatus includes as its main component elements: an optical head 610; a disk drive apparatus 612; a detection circuit 614; a reproducing circuit (i.e., the reproducing means) 616; a tracking control circuit (i.e., the tracking controlling means) 618; a focus control circuit (i.e., the focus controlling means) 620; and the like. Herein, the optical information apparatus may also configured so as to record information in the optical disks 205 and 606 and so as to reproduce information which is recorded in the optical disks 205 and 606.

The detection circuit 614 generates a reproducing signal based on a beam of light which is emitted from the semiconductor lasers 220, 602 of the optical head 610 and is reflected by the optical disks 205 and 606. In addition, it generates a tracking error signal and a focus error signal, based on a branching beam of light which branches from the emitted beam of light. The reproducing circuit 616 reproduces information which is recorded in the optical disks 205 and 606, based on the reproducing signal. The tracking control circuit 618 controls the optical head 610, so that the tracking error can be compensated based on the tracking error signal. The focus control circuit controls the optical head 610, so that the focus error can be compensated based on the focus error signal.

The optical head, the optical information apparatus and the optical-information reproducing method according to the present invention have the function of recording and reproducing information in and from an information recording medium. Thus, they are useful as a recording and reproducing apparatus for an image or music, or the like. In addition, they can also be applied for the storage of data or a program in a computer, the storage of car-navigation map data, or the like.

This application is based on Japanese patent application serial No. 2004-175130, filed in Japan Patent Office on Jun. 14, 2004, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical head, comprising:
   a light source for emitting a beam of light;
   a light-concentrating element arranged to concentrate the beam of light on an information recording medium that includes a track in a recording area;
   a transfer mechanism for transferring the light-concentrating element at least between an outermost circumference and an innermost circumference of the recording area along the information recording medium;
   a splitting element arranged to split a beam of light that returns from the information recording medium into a plurality of beams of light; and
   a detector arranged to detect the plurality of beams of light that is obtained by the splitting element, wherein,
   the splitting element includes a plurality of areas which are divided by a division line,
   the division line is set parallel to tangential directions of the track in a middle in radius directions of the recording area on a transfer line of the light-concentrating element between the outermost circumference and the innermost circumference of the recording area, and
   the division line is set in directions which halve an angle at which the tangential directions of the track at the outermost circumference of the recording area on the transfer line meet the tangential directions of the track at the innermost circumference of the recording area on the transfer line.

2. The optical head according to claim 1, wherein the splitting element is formed by a hologram element.

3. The optical head according to claim 1, wherein the plurality of areas are divided, by a lateral division line which intersects the division line, into a first area on which a beam of light that mainly includes a tracking component is incident and a second area on which a beam of light that does not include the tracking component is incident.

4. An optical head, comprising:
- a light source for emitting a beam of light;
- a light-concentrating element arranged to concentrate the beam of light on an information recording medium that includes a track in a recording area;
- a transfer mechanism for transferring the light-concentrating element at least between an outermost circumference and an innermost circumference of the recording area along the information recording medium;
- a splitting element arranged to split a beam of light that returns from the information recording medium into a plurality of beams of light; and
- a detector arranged to detect the plurality of beams of light that is obtained by the splitting element, wherein,
- the splitting element includes a plurality of areas which are divided by a division line,
- the division line is set parallel to tangential directions of the track in a middle in radius directions of the recording area on a transfer line of the light-concentrating element between the outermost circumference and the innermost circumference of the recording area, and
- wherein the division line is set parallel to the track in an average radius position of an outermost circumference radius and an innermost circumference radius of the recording area on the transfer line.

5. The optical head according to claim 1, wherein:
- the plurality of areas are divided by two lateral division lines, the lateral division lines being provided parallel to each other; and
- each lateral division line is set perpendicular to the tangential directions of the track in a predetermined position between the outermost circumference and the innermost circumference of the recording area on the transfer line.

6. The optical head according to claim 1, wherein:
- the light-concentrating element comprises a plurality of light-concentrating elements, and the light source comprises a plurality of light sources; and
- the transfer line of at least one light-concentrating element is located out of a center of the information recording medium.

7. The optical head according to claim 6, wherein the light-concentrating element whose transfer line is located out of the center of the information recording medium concentrates a blue laser beam.

8. The optical head according to claim 6, wherein the transfer line of at least one light-concentrating element passes through the center of the information recording medium.

9. The optical head according to claim 8, wherein the light-concentrating element whose transfer line passes through the center of the information recording medium concentrates a red laser beam or an infrared laser beam, and a diffraction grating is provided which splits into three a beam of light which is incident on this light-concentrating element.

10. An optical head, comprising:
- a light source for emitting a beam of light;
- a light-concentrating element arranged to concentrate a beam of light from the light source on an information recording medium that includes a track;
- a transfer mechanism for transferring the light-concentrating element at least between an outermost circumference and an innermost circumference of a recording area along the information recording medium; and
- a detector arranged to detect a beam of light that returns from the information recording medium, wherein
- the detector includes a plurality of areas which are divided by a division line,
- the division line is set parallel to tangential directions of the track in a middle in radius directions of the recording area on a transfer line of the light-concentrating element between the outermost circumference and the innermost circumference of the recording area,
- the division line is set in directions which halve an angle at which the tangential directions of the track at the outermost circumference of the recording area on the transfer line meet the tangential directions of the track at the innermost circumference of the recording area on the transfer line, and
- the plurality of areas are divided, by a lateral division line which intersects the division line, into a first area on which a beam of light that mainly includes a tracking component is incident and a second area on which a beam of light that does not include the tracking component is incident.

11. An optical head, comprising:
- a light source for emitting a beam of light;
- a light-concentrating element arranged to concentrate a beam of light from the light source on an information recording medium that includes a track;
- a transfer mechanism for transferring the light-concentrating element at least between an outermost circumference and an innermost circumference of a recording area along the information recording medium; and
- a detector arranged to detect a beam of light that returns from the information recording medium, wherein
- the detector includes a plurality of areas which are divided by a division line,
- the division line is set parallel to tangential directions of the track in a middle in radius directions of the recording area on a transfer line of the light-concentrating element between the outermost circumference and the innermost circumference of the recording area,
- wherein the division line is set parallel to the track in an average radius position of an outermost-circumference radius and an innermost-circumference radius of the recording area on the transfer line, and
- the plurality of areas are divided, by a lateral division line which intersects the division line, into a first area on which a beam of light that mainly includes a tracking component is incident and a second area on which a beam of light that does not include the tracking component is incident.

12. The optical head according to claim 10, wherein:
- the lateral division line comprises two lateral division lines, the two lateral division lines being provided parallel to each other; and
- each lateral division line is set perpendicular to the tangential directions of the track in a predetermined position between the outermost circumference and the innermost circumference of the recording area on the transfer line.

13. The optical head according to claim 10, wherein:
- the light-concentrating element comprises a plurality of light-concentrating elements, and the light source comprises a plurality of light sources; and
- the transfer line of at least one light-concentrating element is located out of a center of the information recording medium.

14. The optical head according to claim 13, wherein the light-concentrating element whose transfer line is located out of the center of the information recording medium concentrates a blue laser beam.

15. The optical head according to claim 13, wherein the transfer line of at least one light-concentrating element passes through the center of the information recording medium.

16. The optical head according to claim 15, wherein the light-concentrating element whose transfer line passes through the center of the information recording medium concentrates a red laser beam or an infrared laser beam, and a diffraction grating is provided which splits into three a beam of light which is incident on this light-concentrating element.

17. An optical information apparatus, comprising:
an optical head which includes
a light source for emitting a beam of light,
a light-concentrating element arranged to concentrate a beam of light from the light source on an information recording medium that includes a track,
a transfer mechanism for transferring the light-concentrating element at least between an outermost circumference and an innermost circumference of a recording area along the information recording medium,
a splitting element arranged to split a beam of light that returns from the information recording medium into a plurality of beams of light, and
a detector arranged to detect the plurality of beams of light that is obtained by the splitting element;
a reproducing circuit operable to reproduce a reproducing signal based on a beam of light that is reflected by the information recording medium;
a tracking control circuit operable to output a signal for compensating a tracking error based on a tracking error signal; and
a focus control circuit operable to output a signal for compensating a focus error based on a focus error signal, wherein
the splitting element includes a plurality of areas which are divided by a division line,
the division line is set parallel to tangential directions of the track in a middle in radius directions of the recording area on a transfer line of the light-concentrating element between the outermost circumference and the innermost circumference of the recording area, and
the division line is set in directions which halve an angle at which the tangential directions of the track at the outermost circumference of the recording area on the transfer line meet the tangential directions of the track at the innermost circumference of the recording area on the transfer line.

18. An optical information apparatus, comprising:
an optical head which includes
a light source for emitting a beam of light,
a light-concentrating element arranged to concentrate a beam of light from the light source on an information recording medium that includes a track,
a transfer mechanism for transferring the light-concentrating element at least between an outermost circumference and an innermost circumference of a recording area along the information recording medium, and
a detector arranged to detect a beam of light that returns from the information recording medium;
a reproducing circuit operable to reproduce a reproducing signal based on a beam of light that is reflected by the information recording medium;
a tracking control circuit operable to output a signal for compensating a tracking error based on a tracking error signal; and
a focus control circuit operable to output a signal for compensating a focus error based on a focus error signal, wherein
the detector includes a plurality of areas which are divided by a division line,
the division line is set parallel to tangential directions of the track in a middle in radius directions of the recording area on a transfer line of the light-concentrating element between the outermost circumference and the innermost circumference of the recording area,
the division line is set in directions which halve an angle at which the tangential directions of the track at the outermost circumference of the recording area on the transfer line meet the tangential directions of the track at the innermost circumference of the recording area on the transfer line, and
the plurality of areas are divided, by a lateral division line which intersects the division line, into a first area on which a beam of light that mainly includes a tracking component is incident and a second area on which a beam of light that does not include the tracking component is incident.

19. An optical information apparatus, comprising:
an optical head which includes
a light source for emitting a beam of light,
a light-concentrating element arranged to concentrate a beam of light from the light source on an information recording medium that includes a track,
a transfer mechanism for transferring the light-concentrating element at least between an outermost circumference and an innermost circumference of a recording area along the information recording medium,
a splitting element arranged to split a beam of light that returns from the information recording medium into a plurality of beams of light, and
a detector arranged to detect the plurality of beams of light that is obtained by the splitting element;
a reproducing circuit operable to reproduce a reproducing signal based on a beam of light that is reflected by the information recording medium;
a tracking control circuit operable to output a signal for compensating a tracking error based on a tracking error signal; and
a focus control circuit operable to output a signal for compensating a focus error based on a focus error signal, wherein
the splitting element includes a plurality of areas which are divided by a division line,
the division line is set parallel to tangential directions of the track in a middle in radius directions of the recording area on a transfer line of the light-concentrating element between the outermost circumference and the innermost circumference of the recording area, and
the division line is set parallel to the track in an average radius position of an outermost circumference radius and an innermost circumference radius of the recording area on the transfer line.

20. An optical information apparatus, comprising:
an optical head which includes
a light source for emitting a beam of light,
a light-concentrating element arranged to concentrate a beam of light from the light source on an information recording medium that includes a track,
a transfer mechanism for transferring the light-concentrating element at least between an outermost circumference and an innermost circumference of a recording area along the information recording medium, and
a detector arranged to detect a beam of light that returns from the information recording medium;
a reproducing circuit operable to reproduce a reproducing signal based on a beam of light that is reflected by the information recording medium;

a tracking control circuit operable to output a signal for compensating a tracking error based on a tracking error signal; and a focus control circuit operable to output a signal for compensating a focus error based on a focus error signal, wherein the detector includes a plurality of areas which are divided by a division line, the division line is set parallel to tangential directions of the track in a middle in radius directions of the recording area on a transfer line of the light-concentrating element between the outermost circumference and the innermost circumference of the recording area, wherein the division line is set parallel to the track in an average radius position of an outermost-circumference radius and an innermost-circumference radius of the recording area on the transfer line, and the plurality of areas are divided, by a lateral division line which intersects the division line, into a first area on which a beam of light that mainly includes a tracking component is incident and a second area on which a beam of light that does not include the tracking component is incident.

* * * * *